(12) United States Patent
Hamano

(10) Patent No.: US 6,763,186 B2
(45) Date of Patent: Jul. 13, 2004

(54) ZOOM LENS, AND CAMERA INCORPORATING SUCH ZOOM LENS

(75) Inventor: Hiroyuki Hamano, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/351,570

(22) Filed: Jan. 24, 2003

(65) Prior Publication Data

US 2003/0175021 A1 Sep. 18, 2003

(30) Foreign Application Priority Data

Jan. 25, 2002 (JP) ........................................ 2002-016944
Jan. 25, 2002 (JP) ........................................ 2002-016946

(51) Int. Cl.$^7$ ............................. G03B 5/00; G02B 5/18; G02B 15/14
(52) U.S. Cl. ................. 396/79; 359/570; 359/684; 359/686; 359/687; 359/690; 359/692; 348/240.3
(58) Field of Search ................. 359/570, 684, 359/686, 687, 689, 690, 691, 692; 396/72, 79; 348/240.3

(56) References Cited

U.S. PATENT DOCUMENTS

| 5,044,706 A | 9/1991 | Chen ........................... 359/357 |
| 5,268,790 A | 12/1993 | Chen ........................... 359/558 |
| 5,790,321 A | 8/1998 | Goto ........................... 359/742 |
| 5,847,882 A | 12/1998 | Nakayama ................... 359/684 |
| 5,978,153 A * | 11/1999 | Nishio ......................... 359/690 |
| 6,016,228 A | 1/2000 | Uzawa ........................ 359/687 |
| 6,081,389 A * | 6/2000 | Takayama et al. .......... 359/680 |
| 6,094,312 A | 7/2000 | Nakayama ................... 359/676 |
| 6,157,488 A | 12/2000 | Ishii ............................ 359/569 |
| 6,542,357 B2 * | 4/2003 | Chuang ....................... 361/683 |
| 6,556,357 B1 * | 4/2003 | Nishimura et al. ......... 359/692 |
| 6,577,450 B2 * | 6/2003 | Hamano et al. ............ 359/687 |

FOREIGN PATENT DOCUMENTS

| JP | 62-24213 | 2/1987 | ........... G02B/15/16 |
| JP | 11-52238 | 2/1999 | ......... G02B/15/167 |
| JP | 11-52244 | 2/1999 | ........... G02B/15/20 |
| JP | 11-305126 | 11/1999 | ........... G02B/15/20 |
| JP | 2000-267005 | 9/2000 | ........... G02B/15/16 |

* cited by examiner

Primary Examiner—W. B. Perkey
(74) Attorney, Agent, or Firm—Morgan & Finnegan, LLP

(57) ABSTRACT

Disclosed is a zoom lens system which uses a diffractive optical element such that high optical performance can be obtained over the overall power variation range. The zoom lens system includes a first lens unit having positive optical power, and a second lens unit having negative optical power and disposed on a rearward side of the first lens unit. A diffractive optical portion is provided on a cemented surface, which is convex toward a forward side, in the first lens unit or the second lens unit.

23 Claims, 29 Drawing Sheets

ZOOM LENS, AND CAMERA INCORPORATING SUCH ZOOM LENS

BACKGROUND OF THE INVENTION

1. Field of the Invention

The present invention relates to a zoom lens preferably usable in optical apparatuses, such as a digital still camera, and a video camera.

2. Related Background Art

In recent digital still cameras, home video cameras, and the like, size and weight have been reduced. In conformity therewith, the size of photo-taking zoom lens has been remarkably decreased. Especially, efforts have been made to shorten the entire length of the lens, reduce the size of its front lens, and simplify its structure.

As a method for achieving those purposes, there has been known a so-called rear focus type zoom lens in which focussing is performed by moving lens units other than a first lens unit on the object side.

Generally, the effective diameter of the first lens in the rear focus zoom lens is smaller than that of a zoom lens which performs focussing by moving the first lens unit, and the size of the entire lens system of the former can be reduced more readily than that of the latter. Further, macro photo-taking, especially super macro photo-taking, can be more readily performed by the former. Additionally, in the former zoom lens, only a small driving force for driving a focussing lens unit is required for its actuator since focussing is performed by moving a small and light-weight lens unit, and focussing can be performed more rapidly than the latter zoom lens which needs to move a larger lens unit, provided that the same actuator is used.

For example, Japanese Patent Laid-Open Nos. 62-24213 and 63-247316 disclose rear focus type zoom lenses in which there are arranged, in the order from an object side, a first lens unit having positive refractive power, a second lens unit having negative refractive power, a third lens unit having positive refractive power, and a fourth lens unit having positive refractive power, the power is varied by moving the second lens unit, and correction of variation of an image surface accompanying the variation of power, and focussing are performed by moving the fourth lens unit.

Further, Japanese Patent Laid-Open No. 8-5913 (U.S. Pat. Nos. 5,847,882 and 6,094,312 are its U.S. counterpart) discloses a rear focus type zoom lens in which there are arranged, in the order from an object side, a first lens unit having positive refractive power, a second lens unit having negative refractive power, a third lens unit having positive refractive power, a fourth lens unit having negative refractive power, and a fifth lens unit having positive refractive power, the power is varied by moving the second lens unit, and correction of the image surface variation accompanying the power variation, and focussing are performed by moving the fourth lens unit.

Further, for purposes of improving a containing capability at non-use (non-photo-taking) time of a camera, it is effective to retract the entire lens system into a camera body. However, in zoom lenses of the above-discussed zoom types in which the second lens unit performs most of power variation, it is unsuitable to retract the lens system since sensitivities of first and second lens units to decentering are too great.

In connection with the above, Japanese Patent Laid-Open No. 10-62687 (its U.S. counterpart is U.S. Pat. No. 6,016, 228) discloses a zoom lens with a zoom ratio of about three, in which there are arranged, in the order from an object side, a first lens unit having positive refractive power, a second lens unit having negative refractive power, a third lens unit having positive refractive power, and a fourth lens unit having positive refractive power, the first lens unit is composed of a single lens, zooming is performed by moving second, third and fourth lens units, and focussing is performed by moving the fourth lens unit. The entire optical system of the zoom lens is simplified, and suitably usable in a retractable structure.

In those zoom lenses, however, on-axis chromatic aberration and chromatic aberration of magnification are likely to increase specially at the telephoto end when the size of the entire lens system and the number of lenses are intended to be reduced. Therefore, conventional zoom lenses are difficult to employ in digital still cameras and video cameras using a pickup element with high-density pixels.

To cope with the above problem, Japanese Patent Laid-Open No. 2000-267005 proposes a zoom lens in which there are arranged, in the order from the object side, four units having positive, negative, positive and positive refractive powers, and a lens formed of an anomalous-dispersion glass material is used in the first lens unit.

On the other hand, the use of a diffractive optical element in a photo-taking optical system has been recently proposed as a method of suppressing chromatic aberrations.

In Japanese Patent Laid-Open Nos. 4-213421 (its U.S. counterpart is U.S. Pat. No. 5,044,706) and 6-324262 (its U.S. counterpart is U.S. Pat. No. 5,790,321), for example, a diffractive optical element is applied to a single lens to reduce the chromatic aberration.

Further, U.S. Pat. No. 5,268,790 proposes the use of a diffractive optical element in the second or third lens unit of a zoom lens such that the number of lenses and the size of the lens system can be made smaller than those of conventional zoom lenses.

Further, in Japanese Patent Laid-Open Nos. 11-52238 and 11-52244, for example, a diffractive optical surface is provided in a first lens unit to reduce the number of lenses in the first lens unit.

Further, in Japanese Patent Laid-Open No. 11-305126, a diffractive optical surface is provided on a jointed lens surface (cemented surface) between two lenses to reduce the chromatic aberration.

Further, when the diffractive optical element is employed in a photo-taking system, a sufficient diffraction efficiency needs to be attained over the overall visible range. In general, the diffraction efficiency of a single-layer diffraction grating decreases at wavelengths other than a designed wavelength, and unnecessary diffracted light in orders other than a designed order causes color flare. Considering such disadvantage, Japanese Patent Laid-Open No. 9-127322 (its U.S. counterpart is U.S. Pat. No. 6,157,488) proposes a system in which three different materials, and two different grating thicknesses of diffraction gratings constituting the diffractive optical element are selected in such an optimum manner that high diffraction efficiency can be obtained in the overall visible range.

Generally, in zoom lenses with high zoom ratio of about ten (10), when the diffractive optical surface is introduced into a first lens unit to correct the chromatic aberration, the angle of light rays incident on the diffractive optical surface greatly changes depending on variations of the angle of view and the focal length. Accordingly, the diffraction efficiency changes, and unnecessary diffracted light hence increases. In structures disclosed in Japanese Patent Laid-Open Nos. 11-52238 and 11-52244, since the diffractive optical surface is provided on a lens surface convex toward the image side, the angle of on-axis light rays incident on the diffractive optical surface largely differ from that of marginal rays. Hence, a sufficient diffraction efficiency cannot be obtained.

Furthermore, when a high diffraction efficiency is intended to achieve in the overall visible range, it is necessary to construct the diffractive optical element of a plurality of diffraction gratings, and set the diffractive optical surface on a cemented surface, on forward and rearward sides of which lenses are arranged. In Japanese Laid-Open No. 11-305126, a diffraction grating is provided on a cemented lens surface, but no incidence condition on the diffraction grating is considered. Therefore, the incidence condition of light rays on the diffraction grating largely changes depending on a change in the angle of view.

SUMMARY OF THE INVENTION

It is an object of the present invention to provide a novel zoom lens which can enjoy high optical performance over an overall zoom range.

In one aspect, a zoom lens system of the present invention includes a first lens unit having optical power, and a second lens unit having negative optical arranged on the rearward side of the first lens unit. In this zoom lens system, the first or second lens unit has a cemented surface (jointed surface) convex toward the forward side, and a diffractive optical portion is provided on the cemented surface.

In a preferred embodiment where the diffractive optical portion is provided on the cemented surface of the first lens unit, the condition of 0.5<RD/f1<1.2 is satisfied where RD is the radius of curvature of the cemented surface, and f1 is the focal length of the first lens unit.

In another preferred embodiment where the diffractive optical portion is provided on the cemented surface of the second lens unit, the condition of −2.8<RD/f2<−1.2 is satisfied where RD is the radius of curvature of the cemented surface, and f2 is the focal length of the second lens unit.

These and further aspects and features of the invention will become apparent from the following detailed description of preferred embodiments thereof in conjunction with the accompanying drawings.

DETAILED DESCRIPTION OF THE PREFERRED EMBODIMENTS

Embodiments of a zoom lens and a camera using the zoom lens of the present invention will be described hereinafter with reference to the drawings. In the zoom lens discussed in each embodiment, radii of curvature of a lens unit incorporating a diffractive optical element and a surface (a curved surface) provided with a diffractive optical portion are appropriately set, and variation of the incident angle on the diffractive optical portion is suppressed in overall zoom range and overall angle of view, so that diffracted light in unnecessary orders is reduced, and preferable optical performance is achieved over the overall zoom range from the wide-angle end to the telephoto end.

Figure 1:
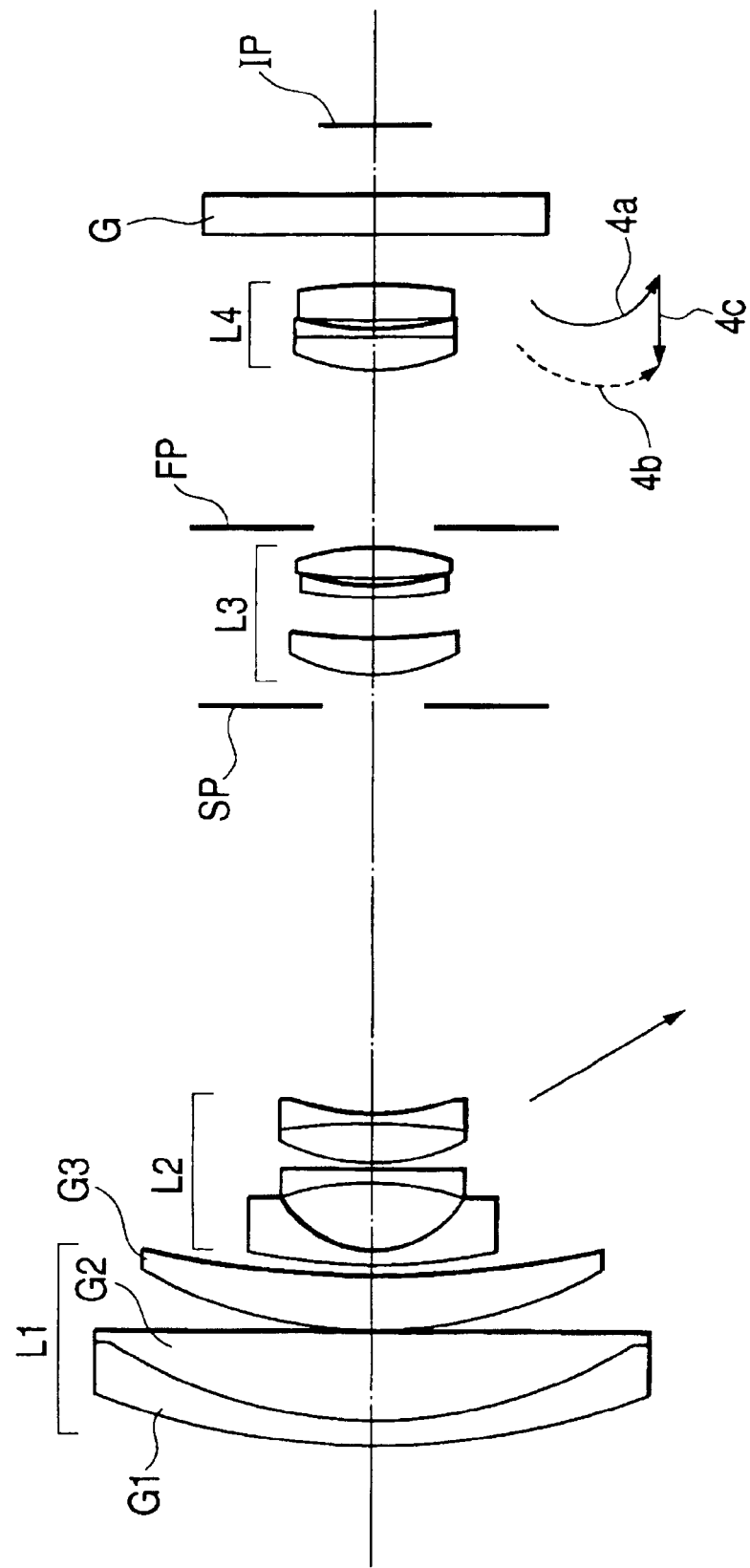
FIG. 1 is a cross-sectional view illustrating a zoom lens of a first numerical example at its wide-angle end.
Figure 2:
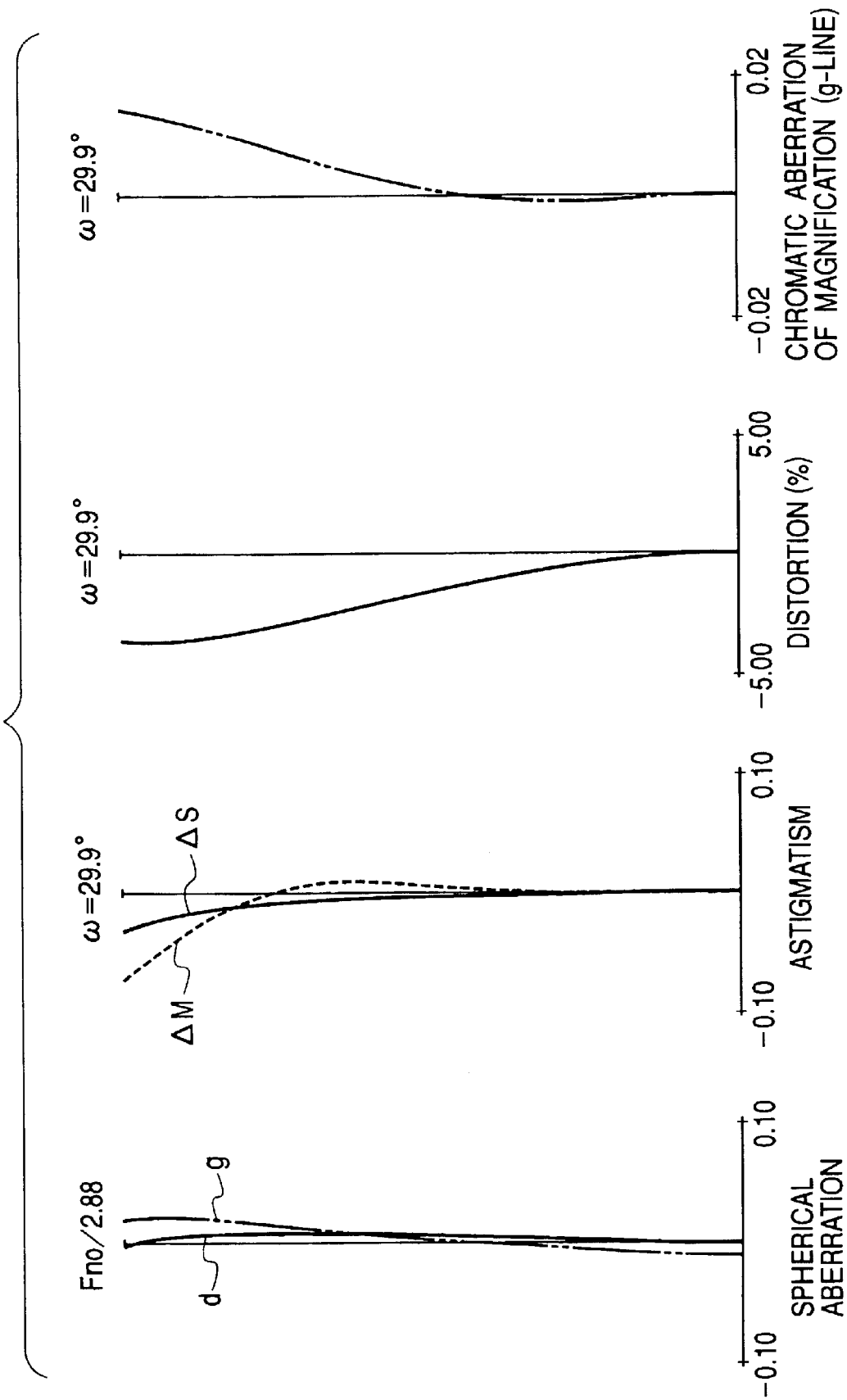
FIG. 2 is a view illustrating aberration charts of the first numerical example at its wide-angle end.
Figure 3:
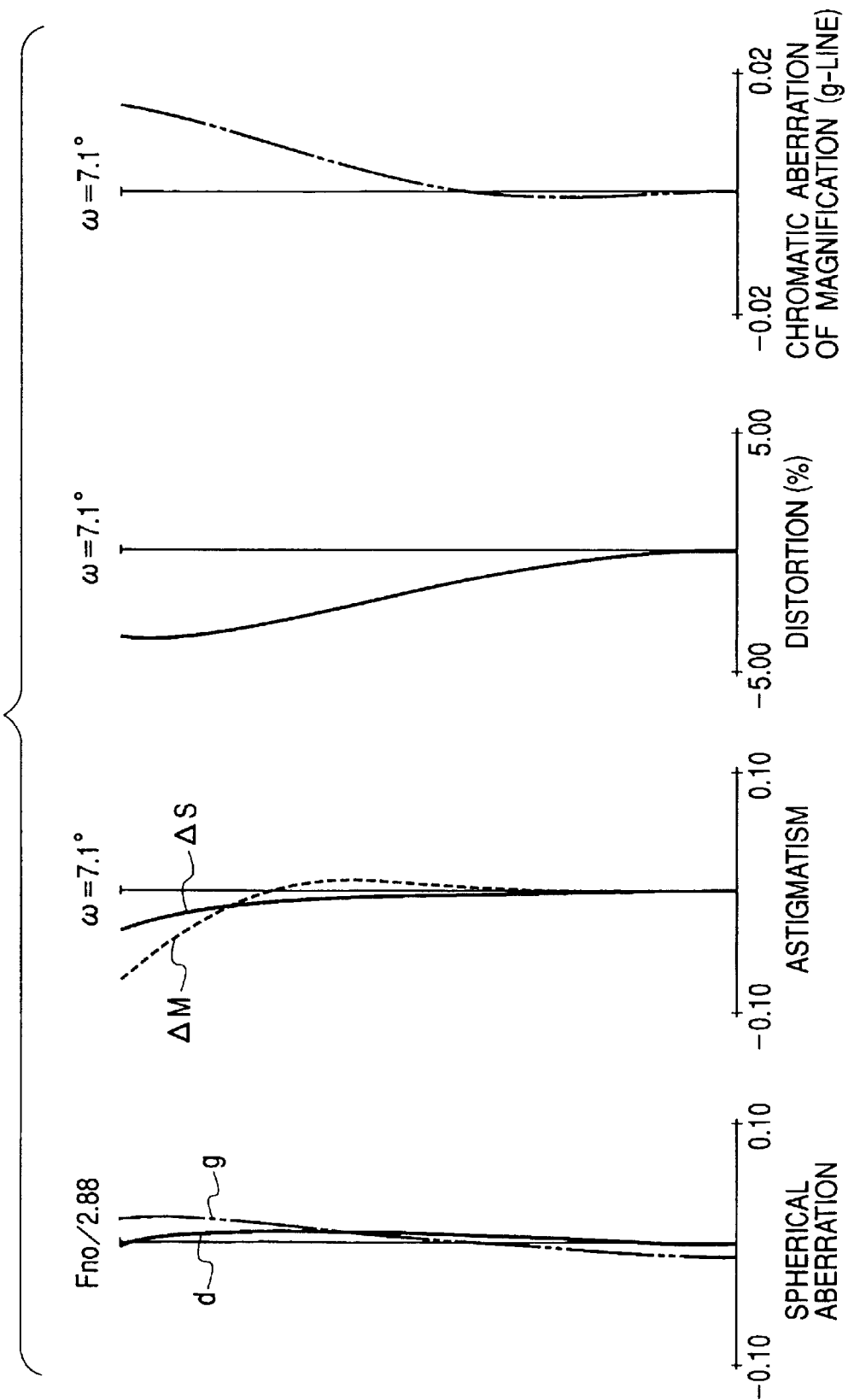
FIG. 3 is a view illustrating aberration charts of the first numerical example at its intermediate zoom position.
Figure 4:
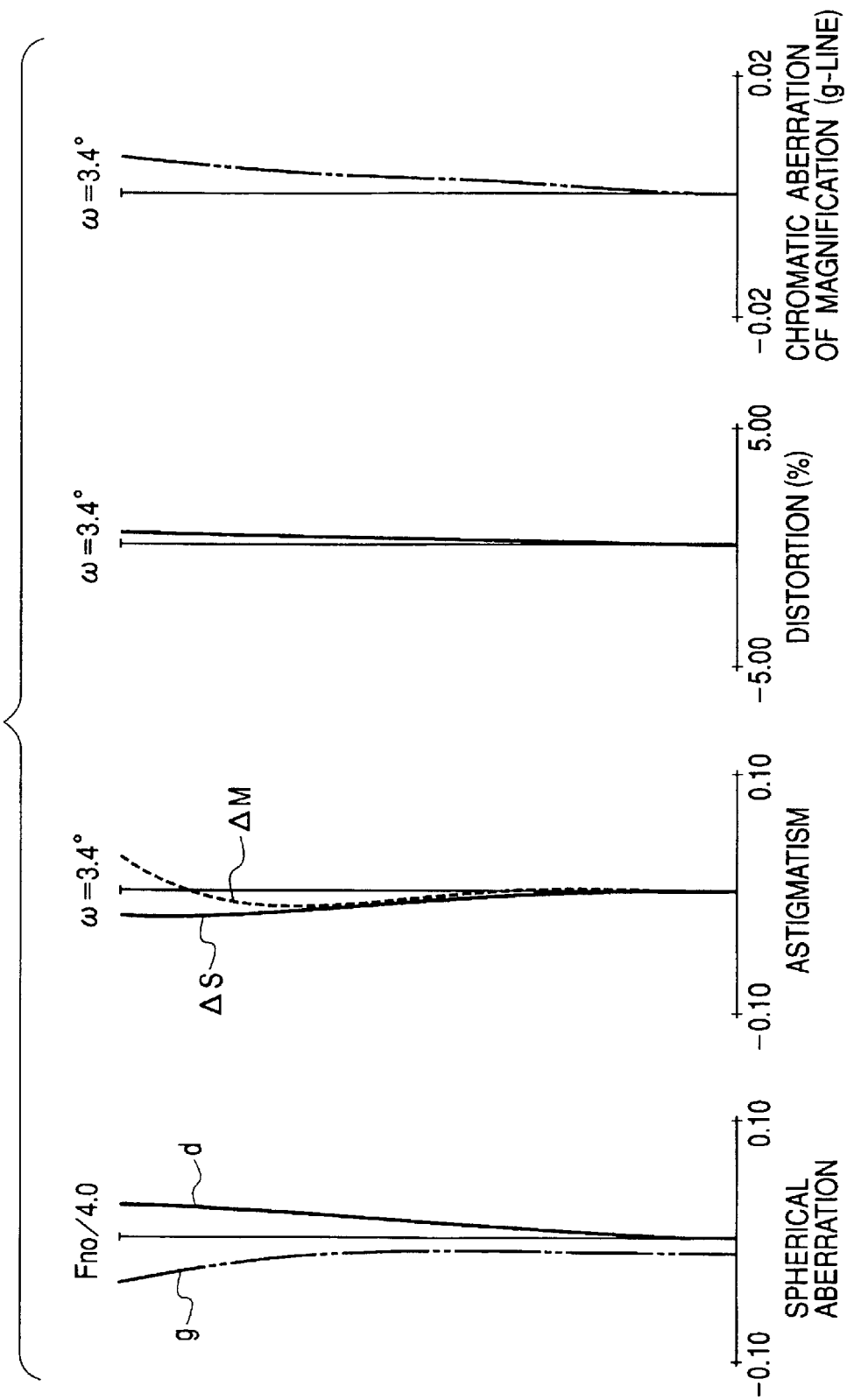
FIG. 4 is a view illustrating aberration charts of the first numerical example at its telephoto end.
Figure 5:
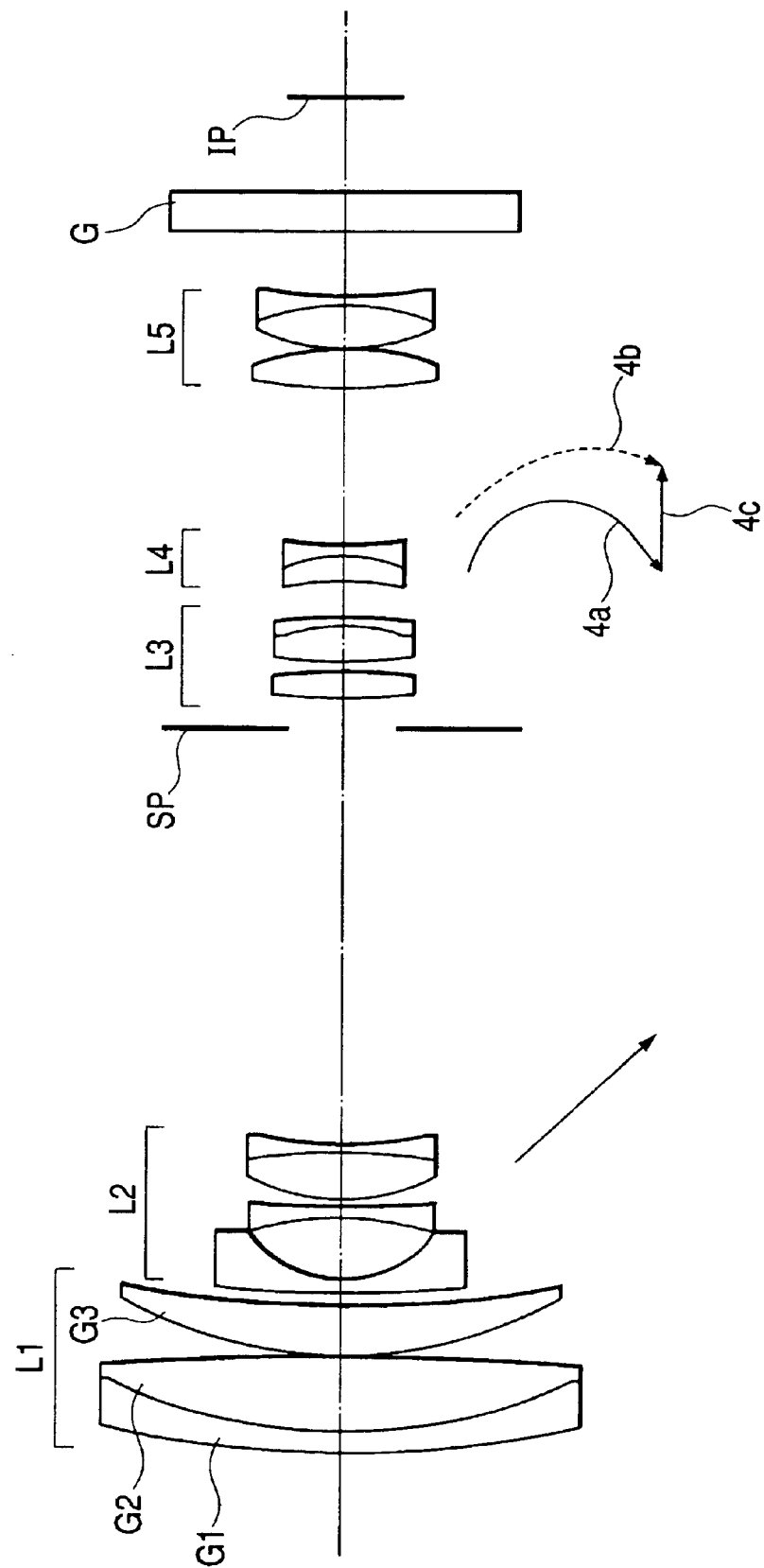
FIG. 5 is a cross-sectional view illustrating a zoom lens of a second numerical example at its wide-angle end.
Figure 6:
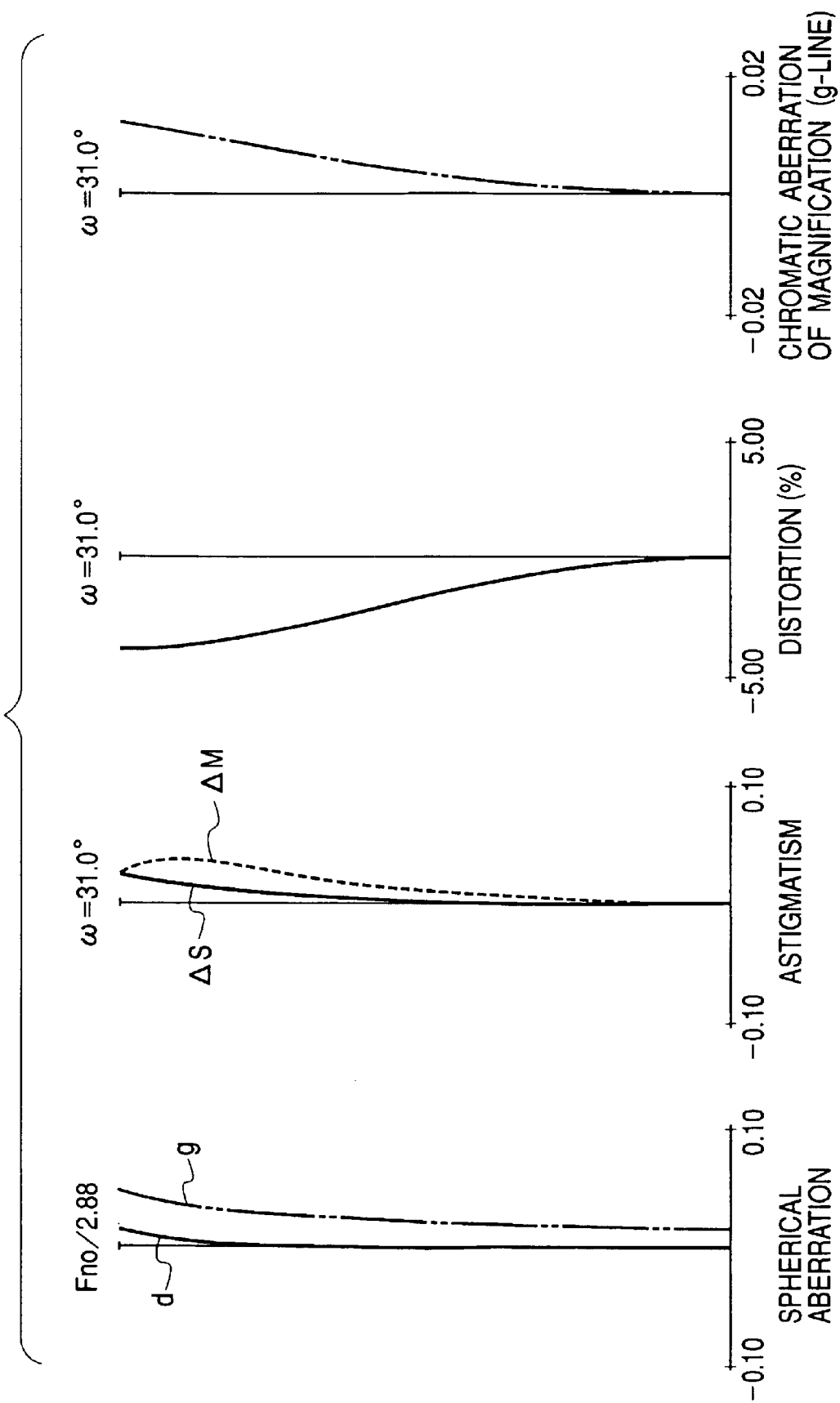
FIG. 6 is a view illustrating aberration charts of the second numerical example at its wide-angle end.
Figure 7:
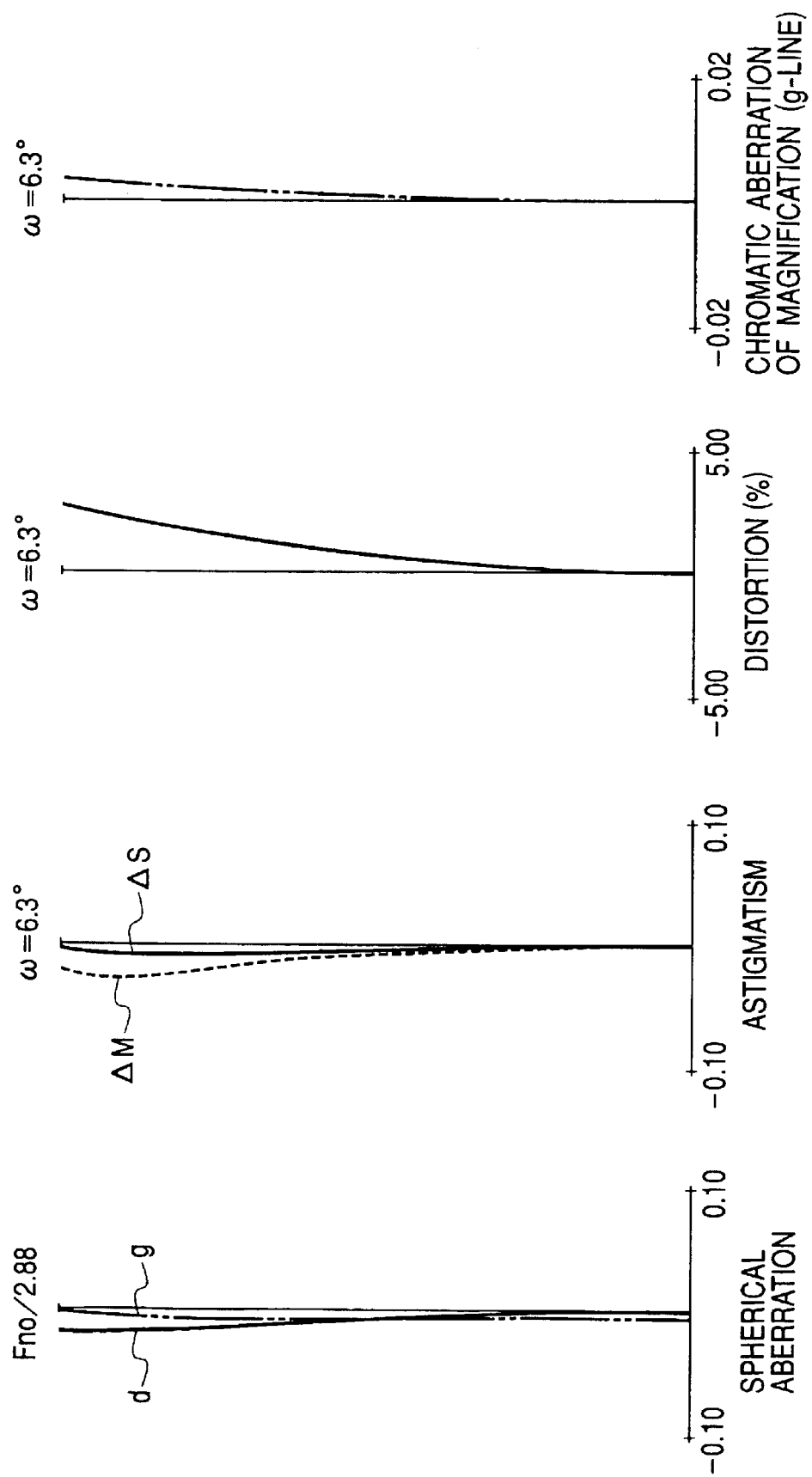
FIG. 7 is a view illustrating aberration charts of the second numerical example at its intermediate zoom position.
Figure 8:
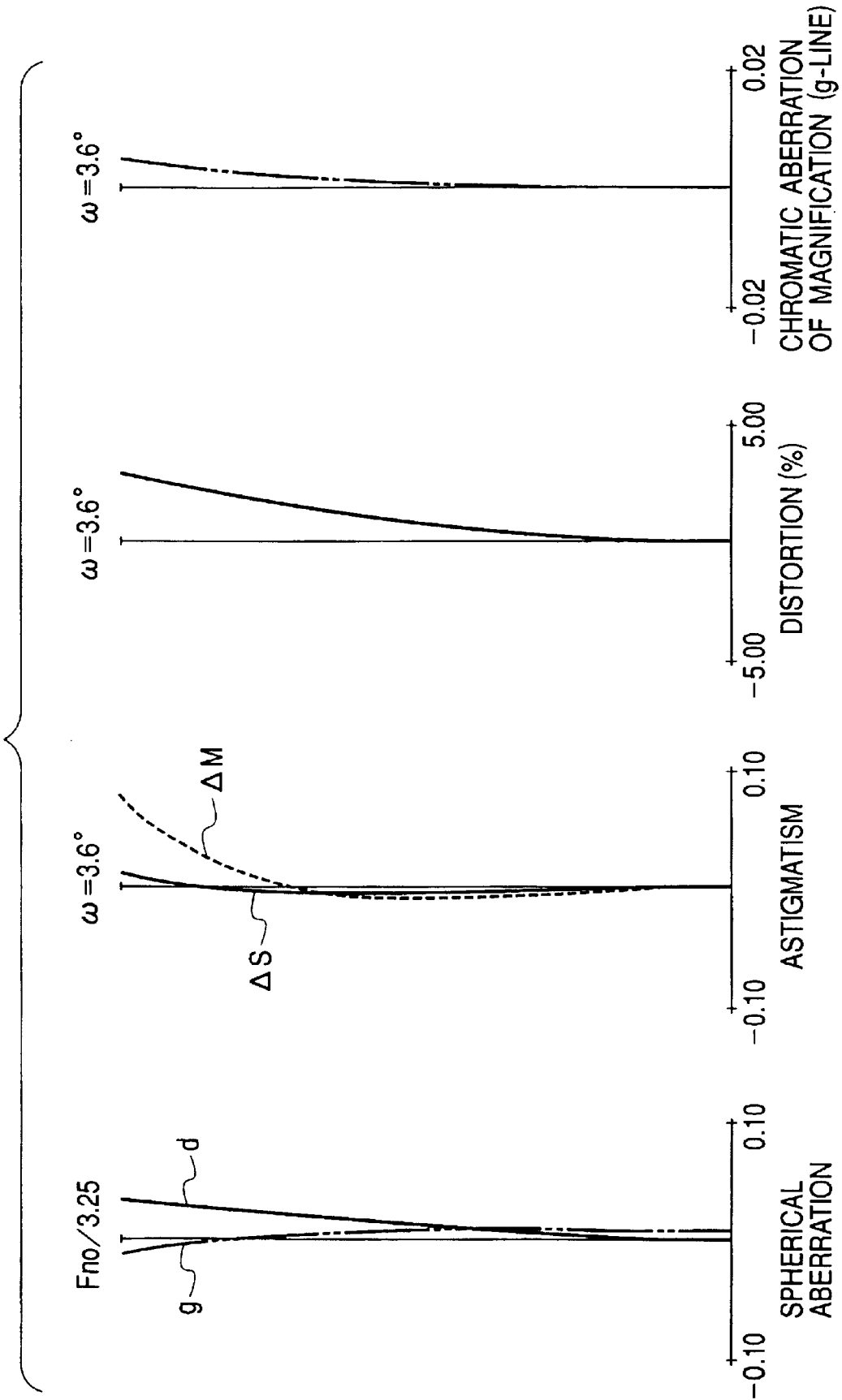
FIG. 8 is a view illustrating aberration charts of the second numerical example at its telephoto end.
Figure 9:
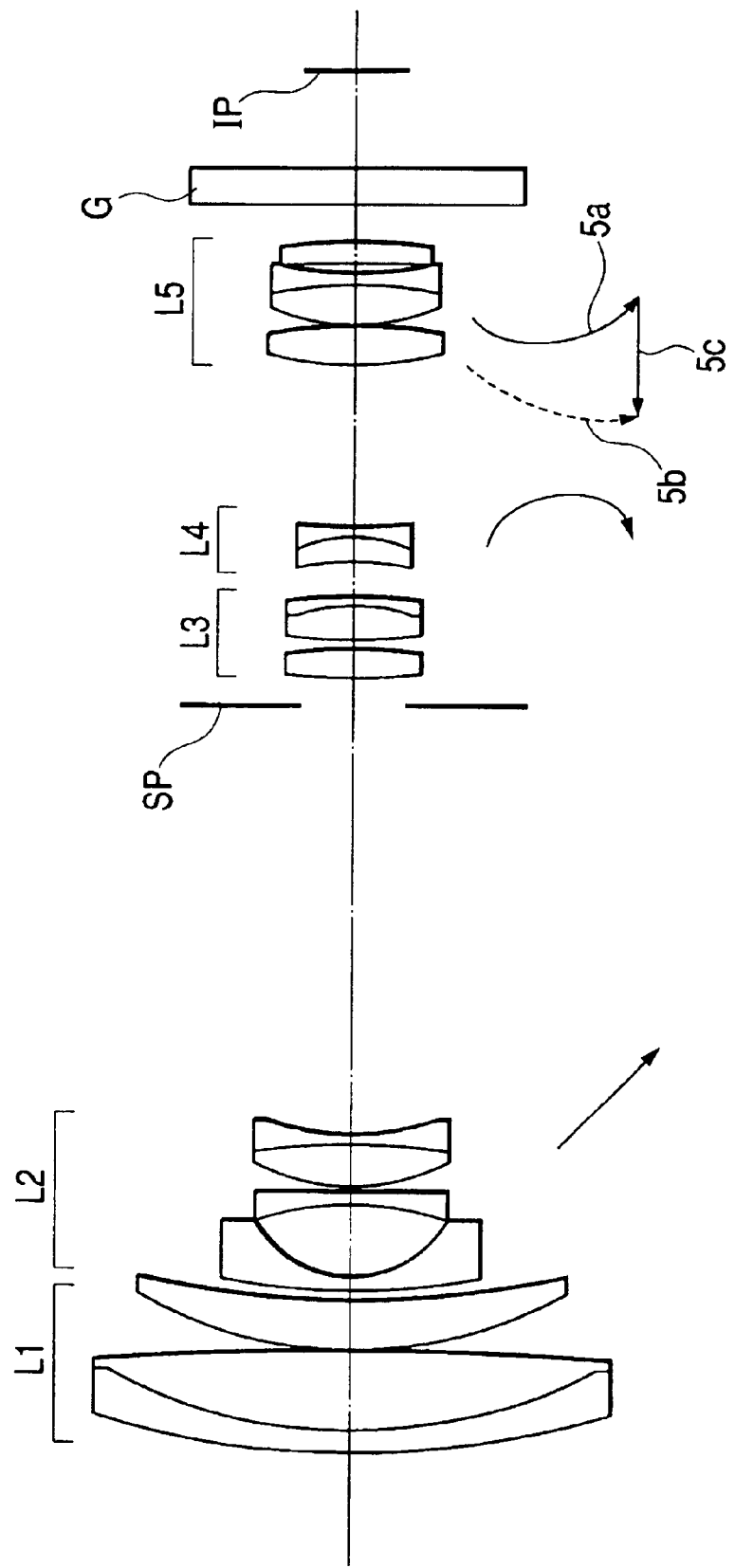
FIG. 9 is a cross-sectional view illustrating a zoom lens of a third numerical example at its wide-angle end.
Figure 10:
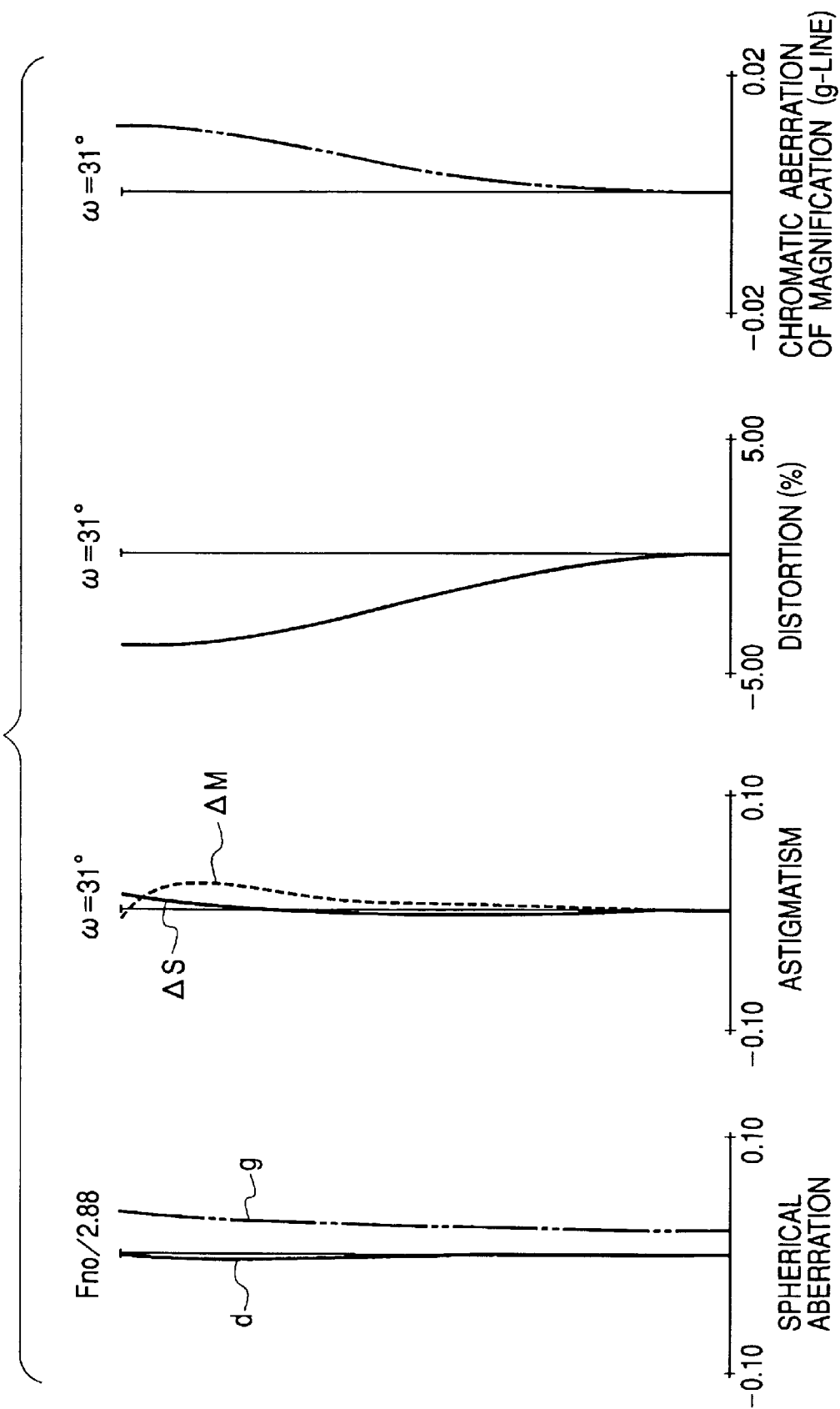
FIG. 10 is a view illustrating aberration charts of the third numerical example at its wide-angle end.
Figure 11:
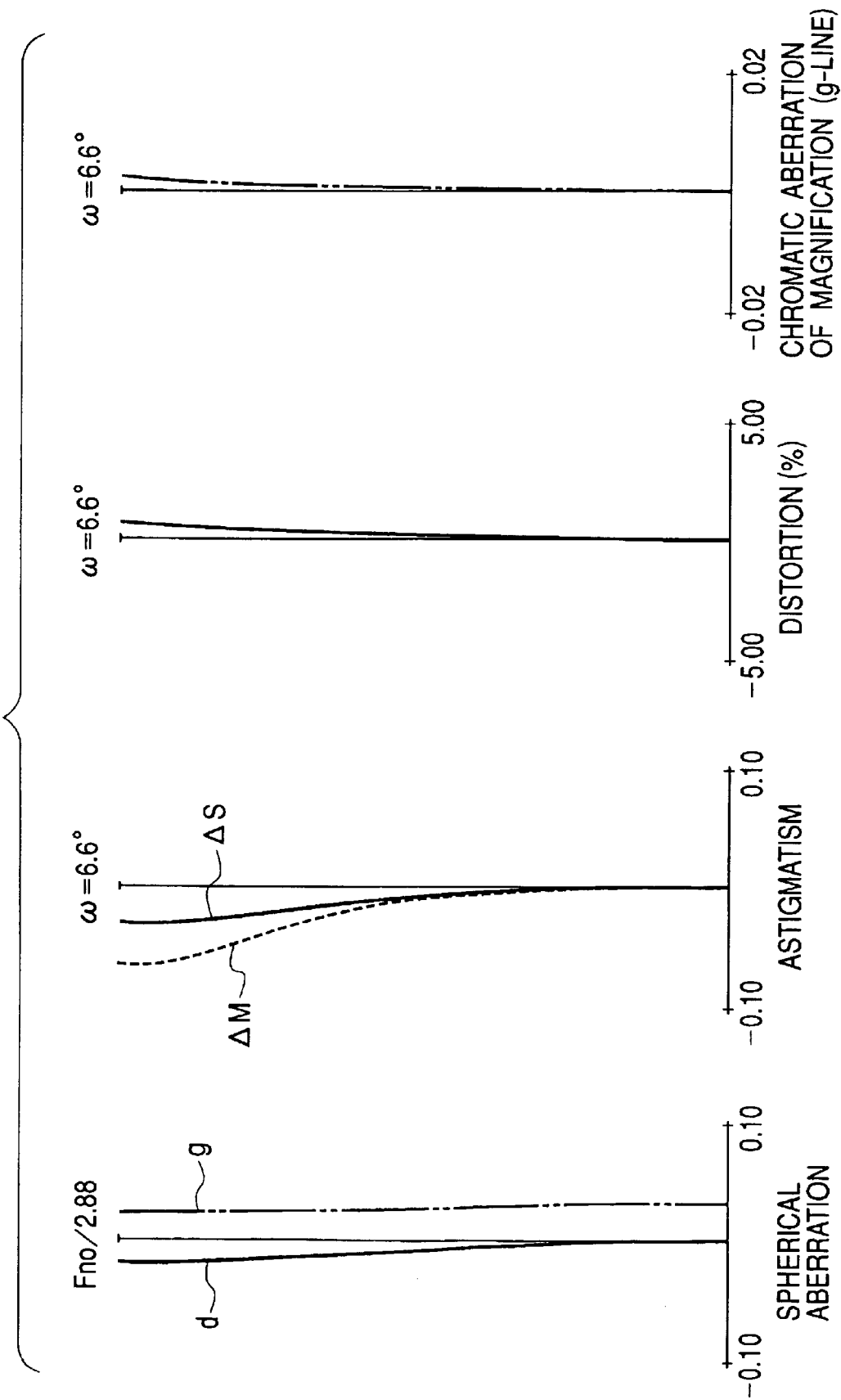
FIG. 11 is a view illustrating aberration charts of the third numerical example at its intermediate zoom position.
Figure 12:
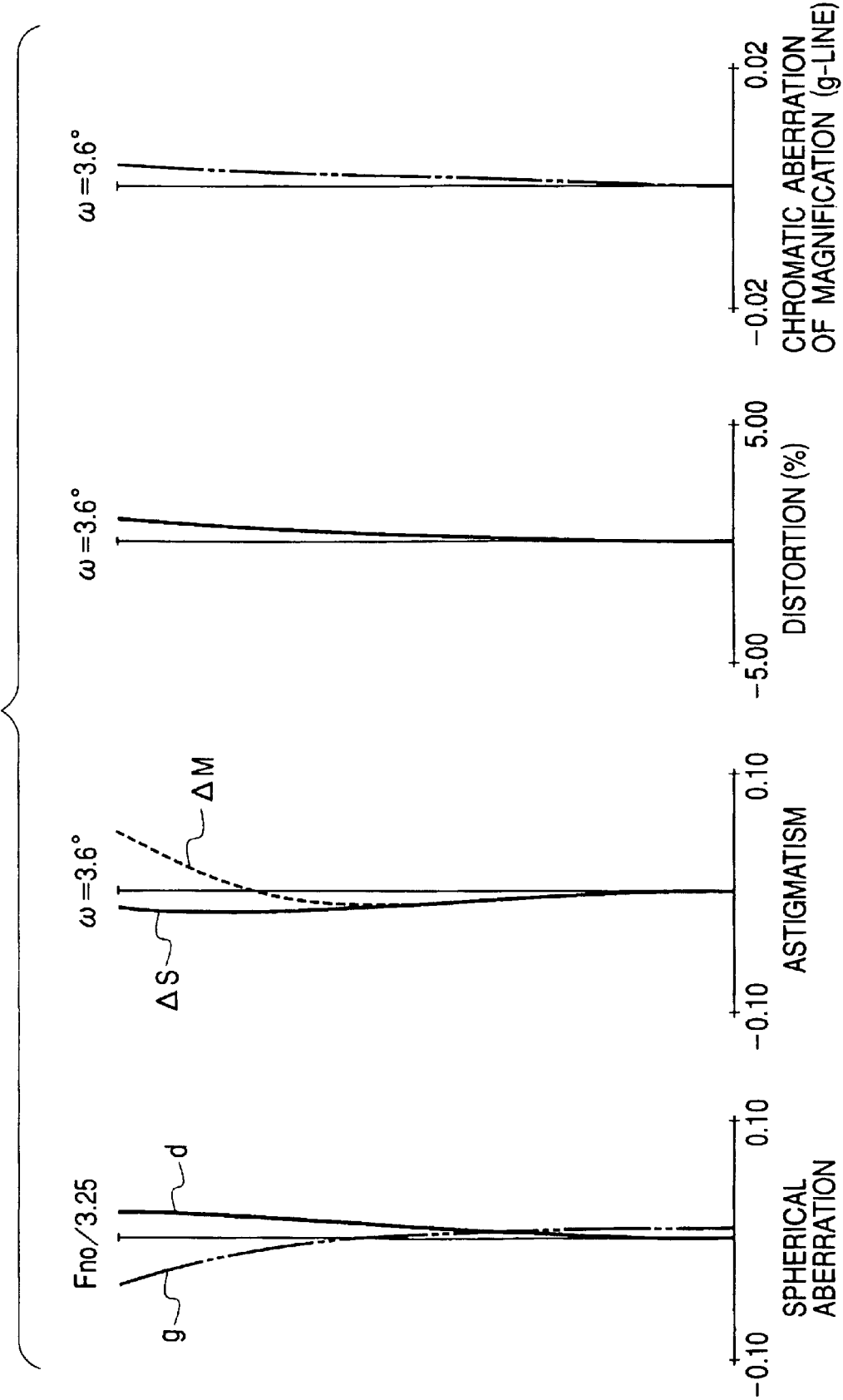
FIG. 12 is a view illustrating aberration charts of the third numerical example at its telephoto end.
Figure 13:
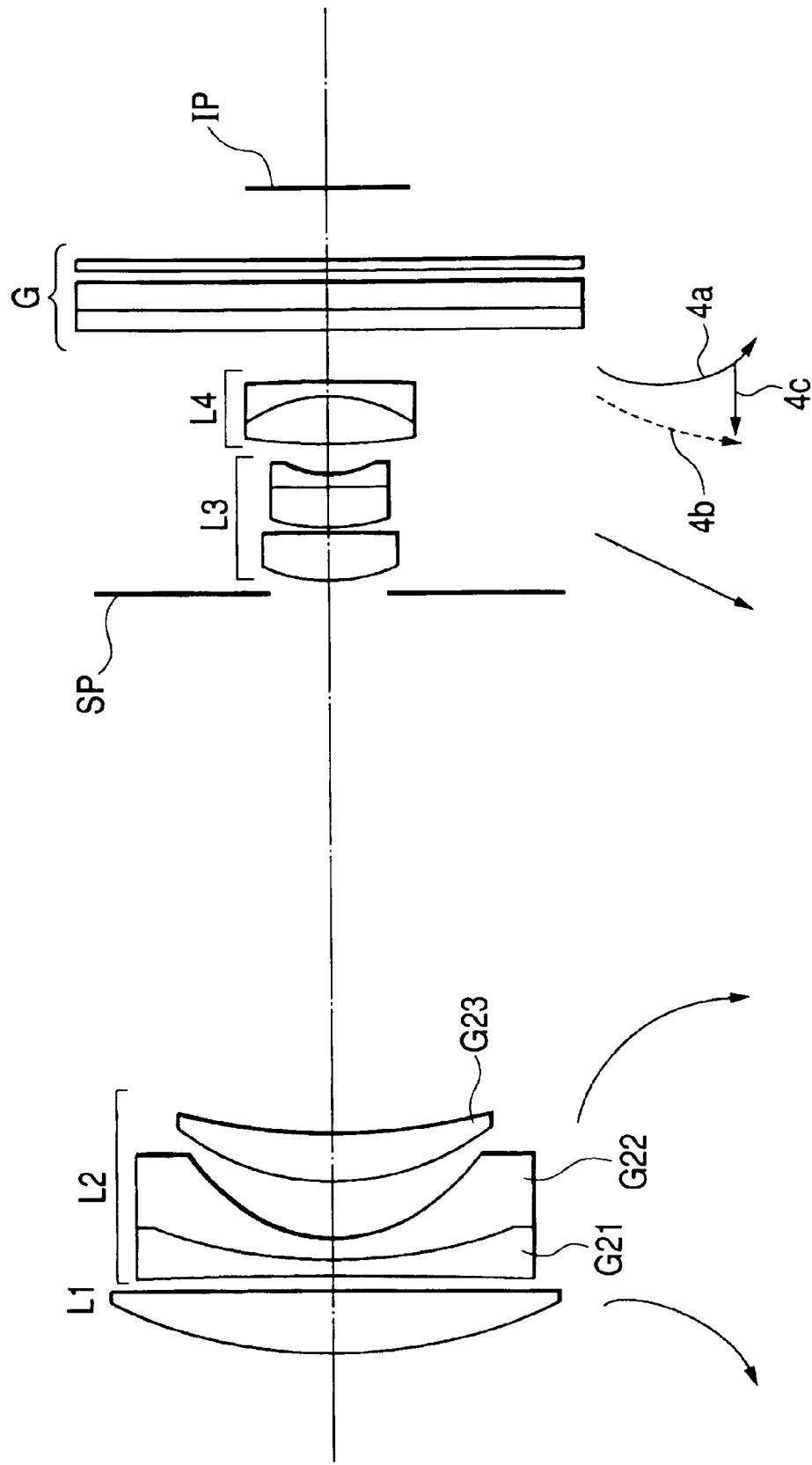
FIG. 13 is a cross-sectional view illustrating a zoom lens of a fourth numerical example at its wide-angle end.
Figure 14:
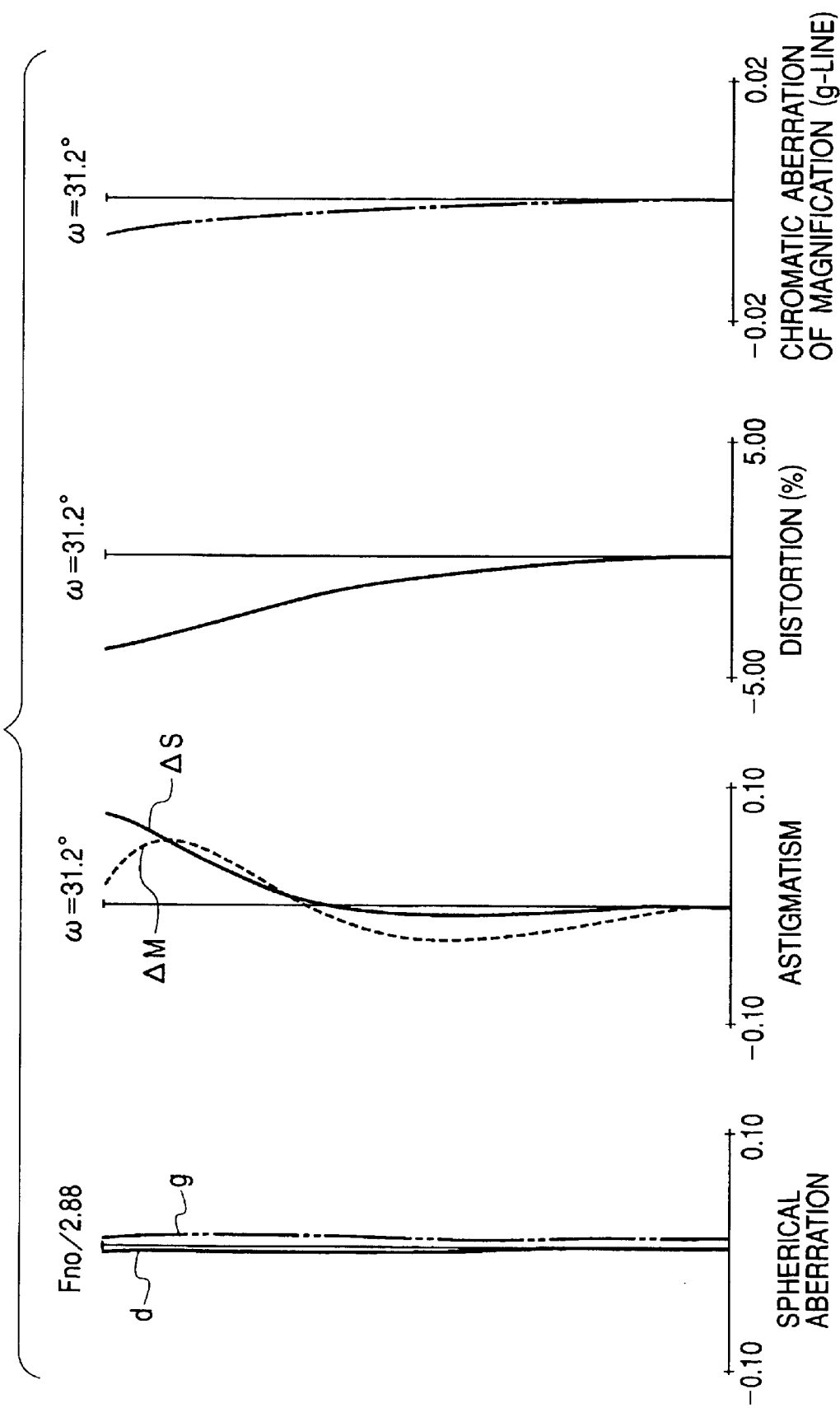
FIG. 14 is a view illustrating aberration charts of the fourth numerical example at its wide-angle end.
Figure 15:
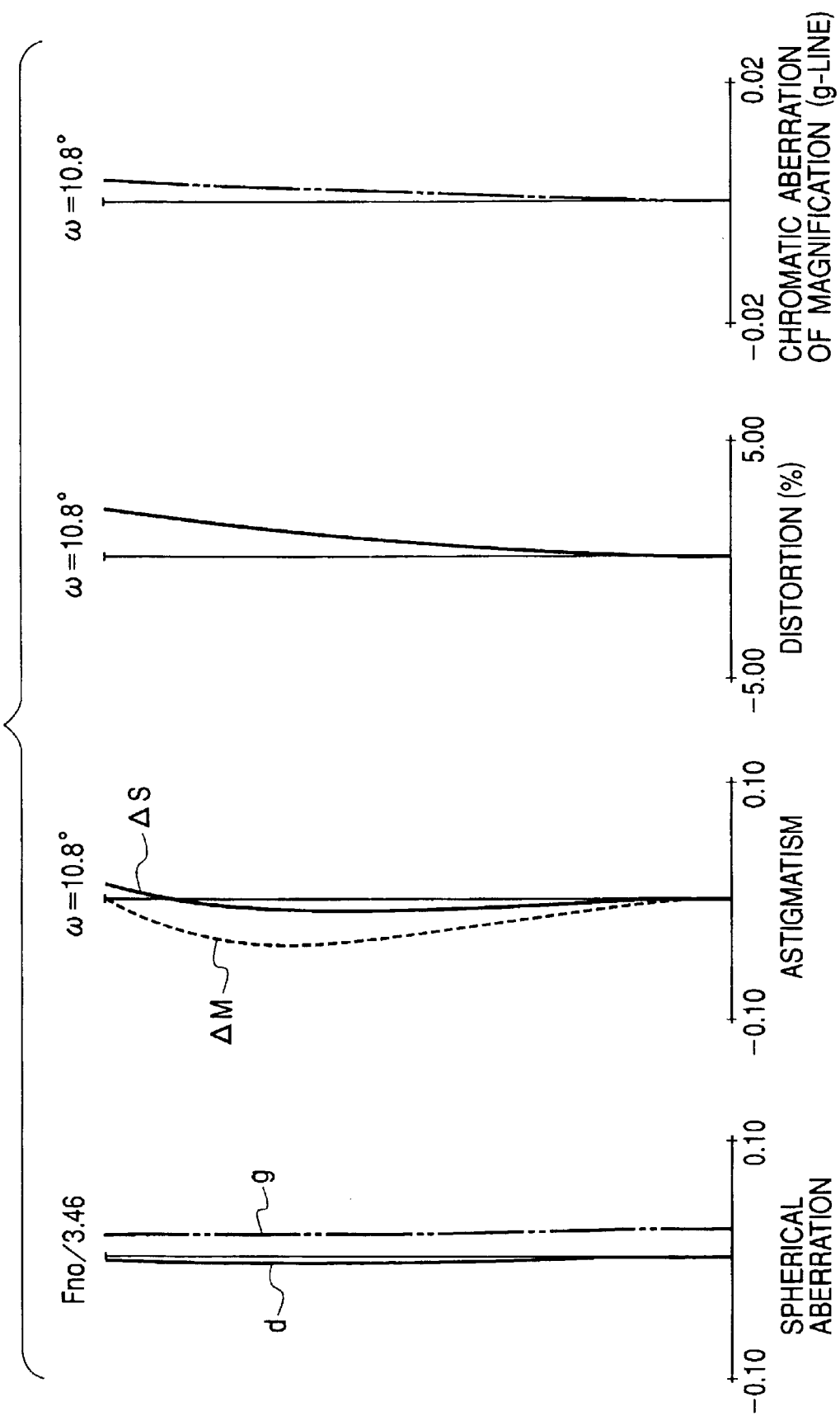
FIG. 15 is a view illustrating aberration charts of the fourth numerical example at its intermediate zoom position.
Figure 16:
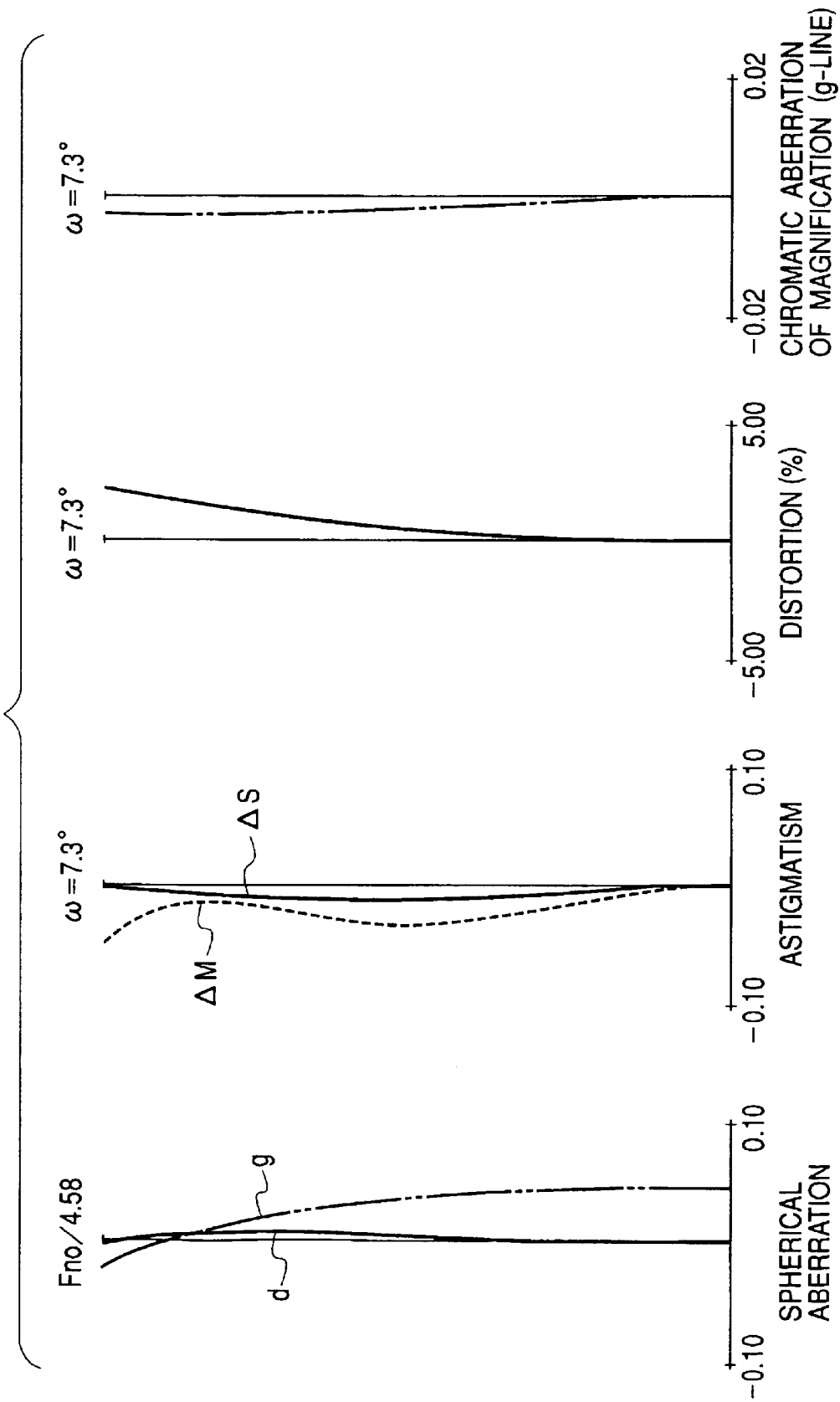
FIG. 16 is a view illustrating aberration charts of the fourth numerical example at its telephoto end.
Figure 17:
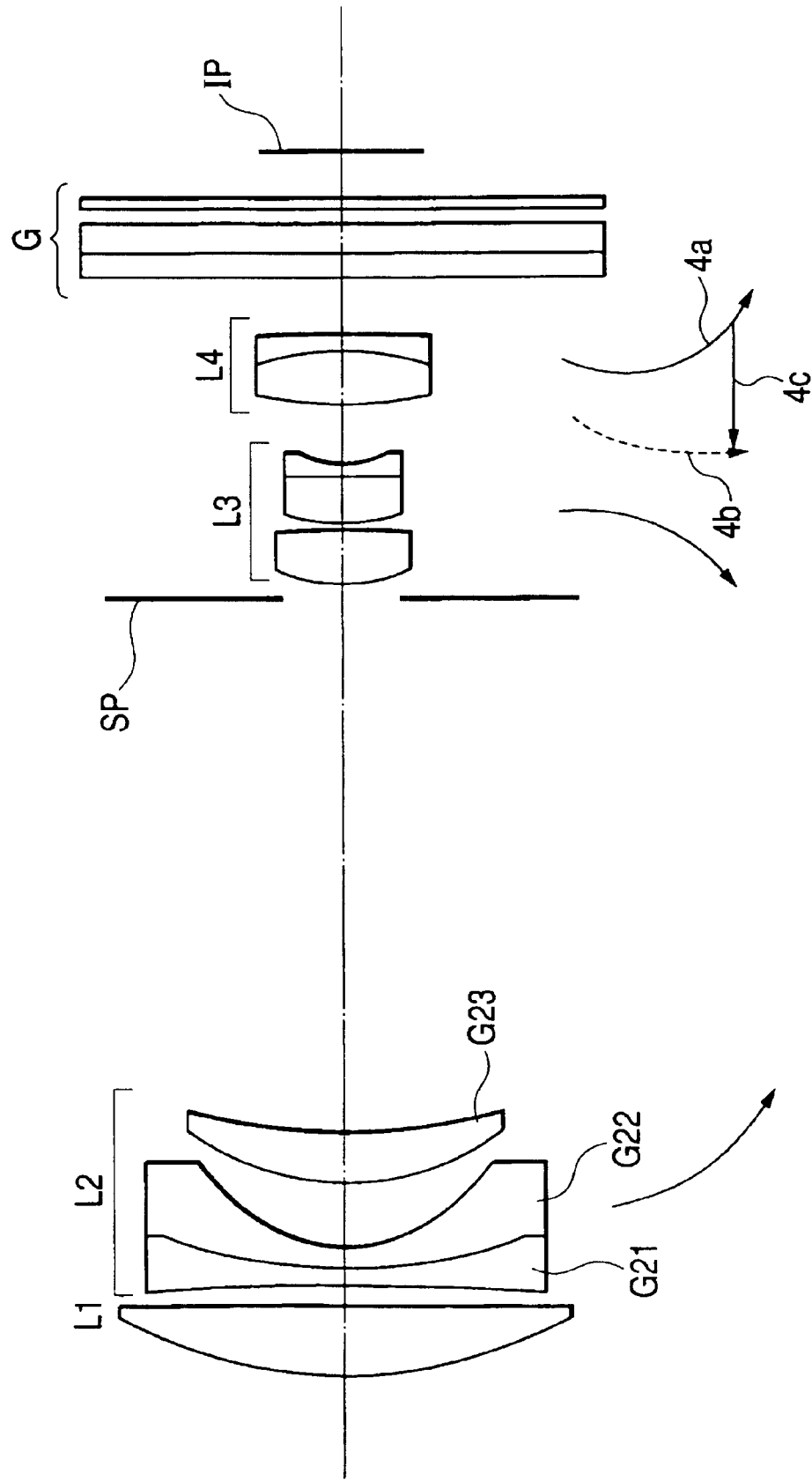
FIG. 17 is a cross-sectional view illustrating a zoom lens of a fifth numerical example at its wide-angle end.
Figure 18:
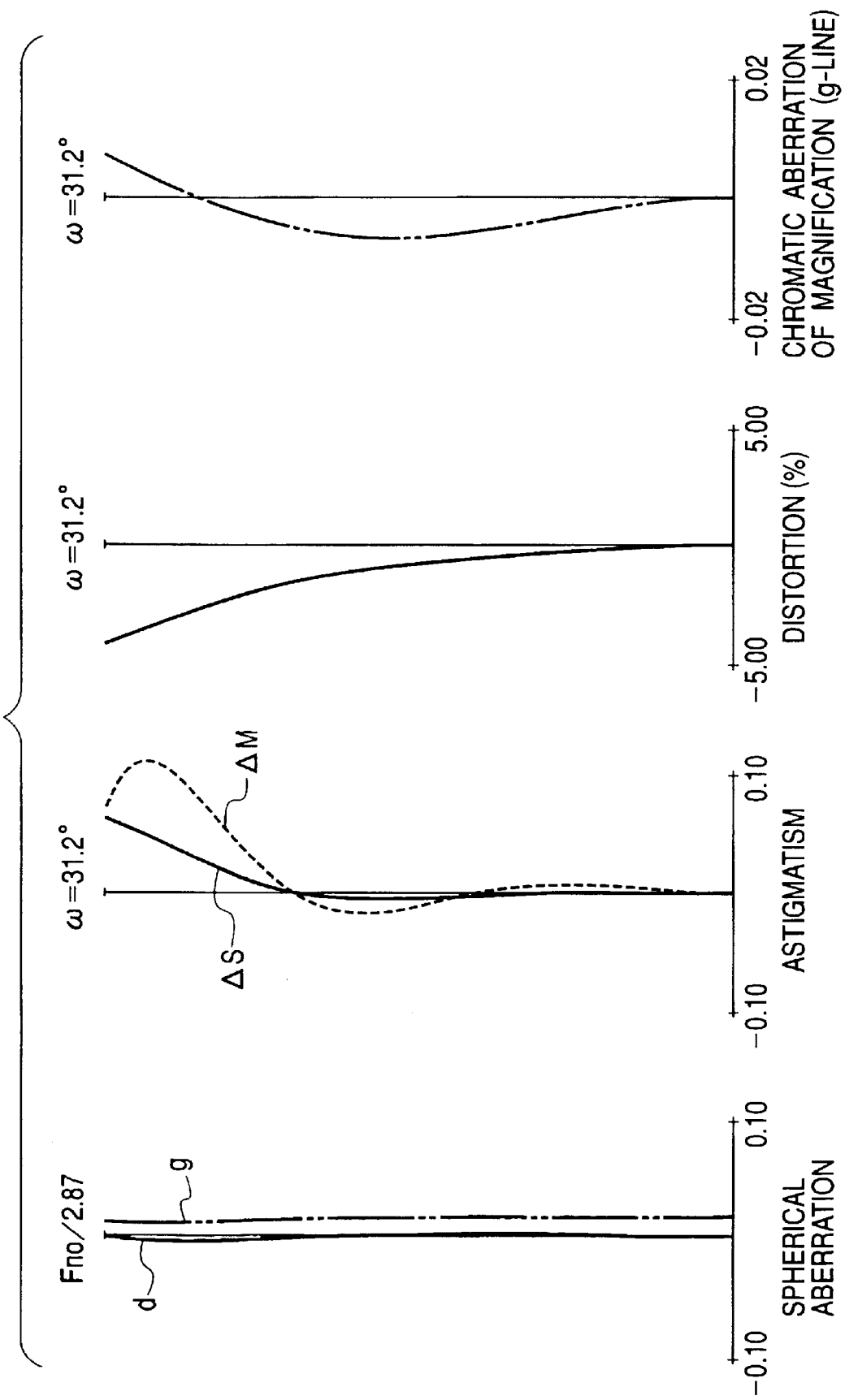
FIG. 18 is a view illustrating aberration charts of the fifth numerical example at its wide-angle end.
Figure 19:
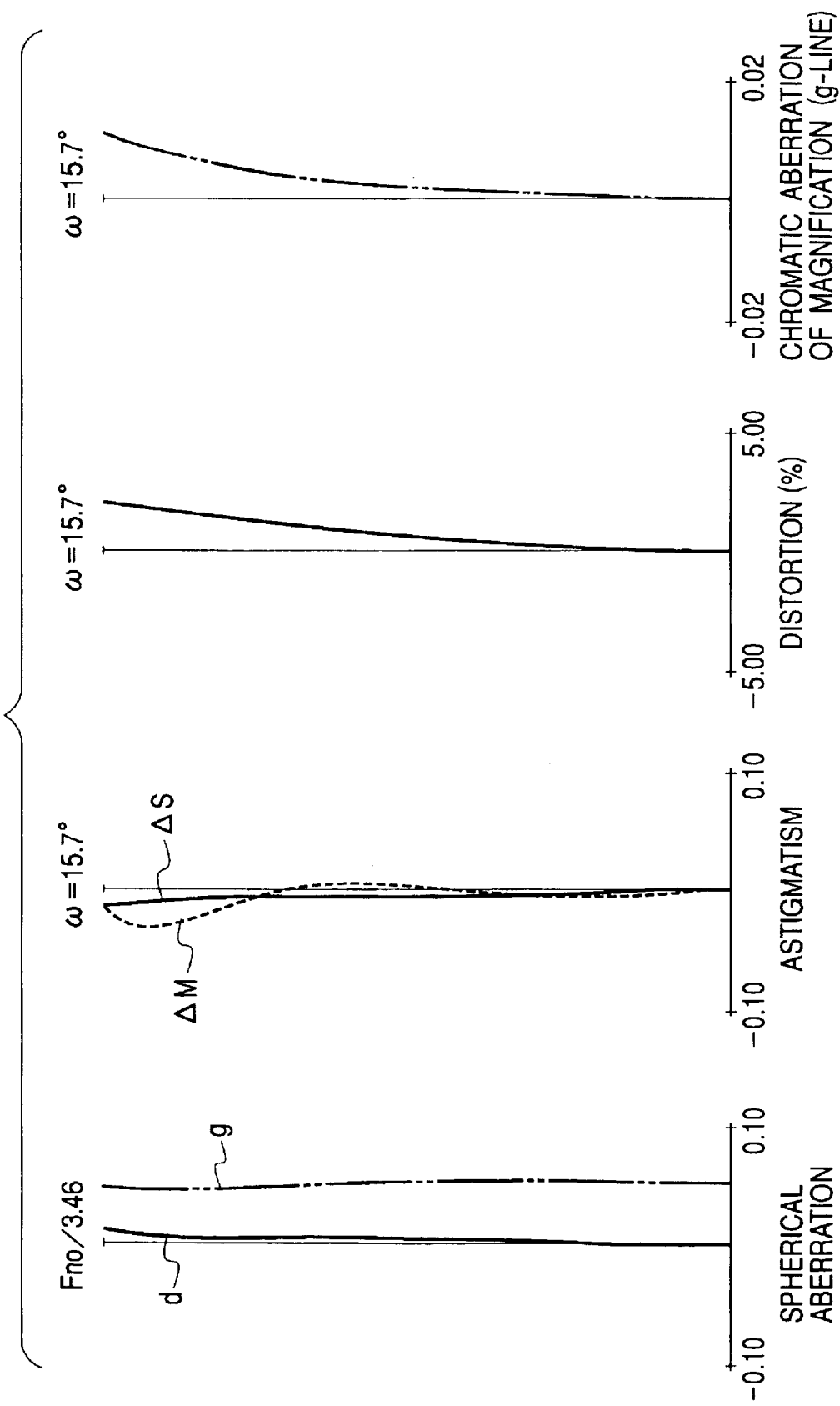
FIG. 19 is a view illustrating aberration charts of the fifth numerical example at its intermediate zoom position.
Figure 20:
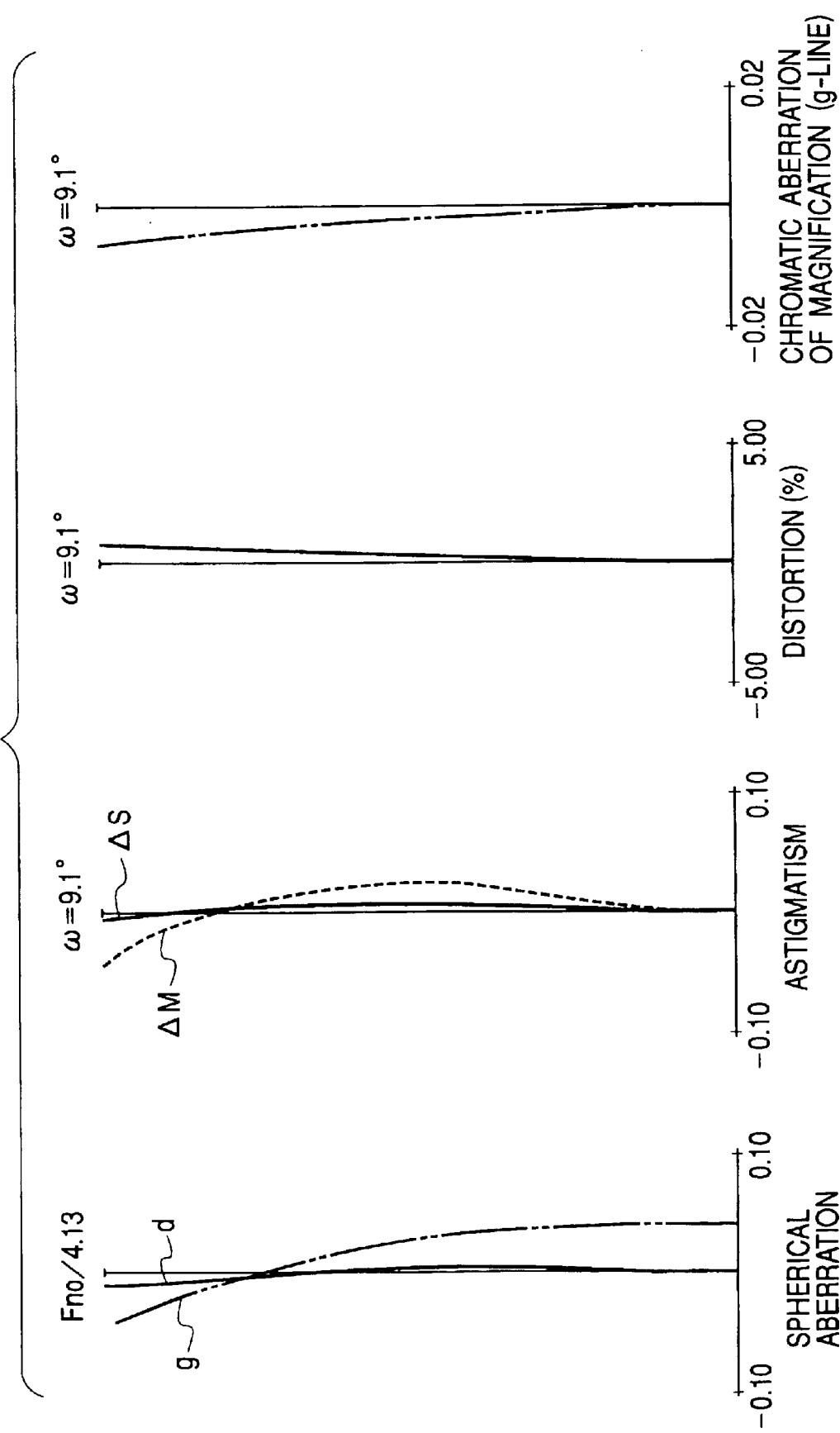
FIG. 20 is a view illustrating aberration charts of the fifth numerical example at its telephoto end.
Figure 21:
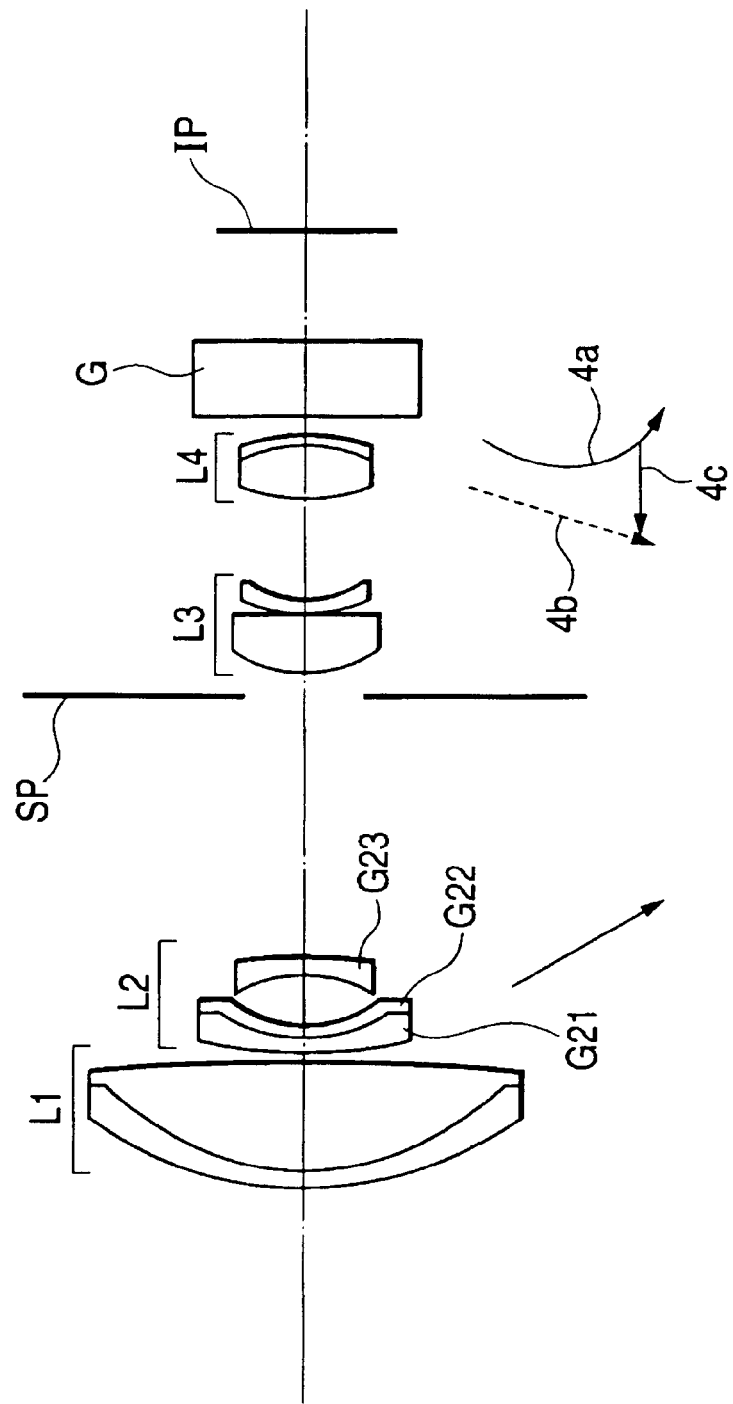
FIG. 21 is a cross-sectional view illustrating a zoom lens of a sixth numerical example at its wide-angle end.
Figure 22:
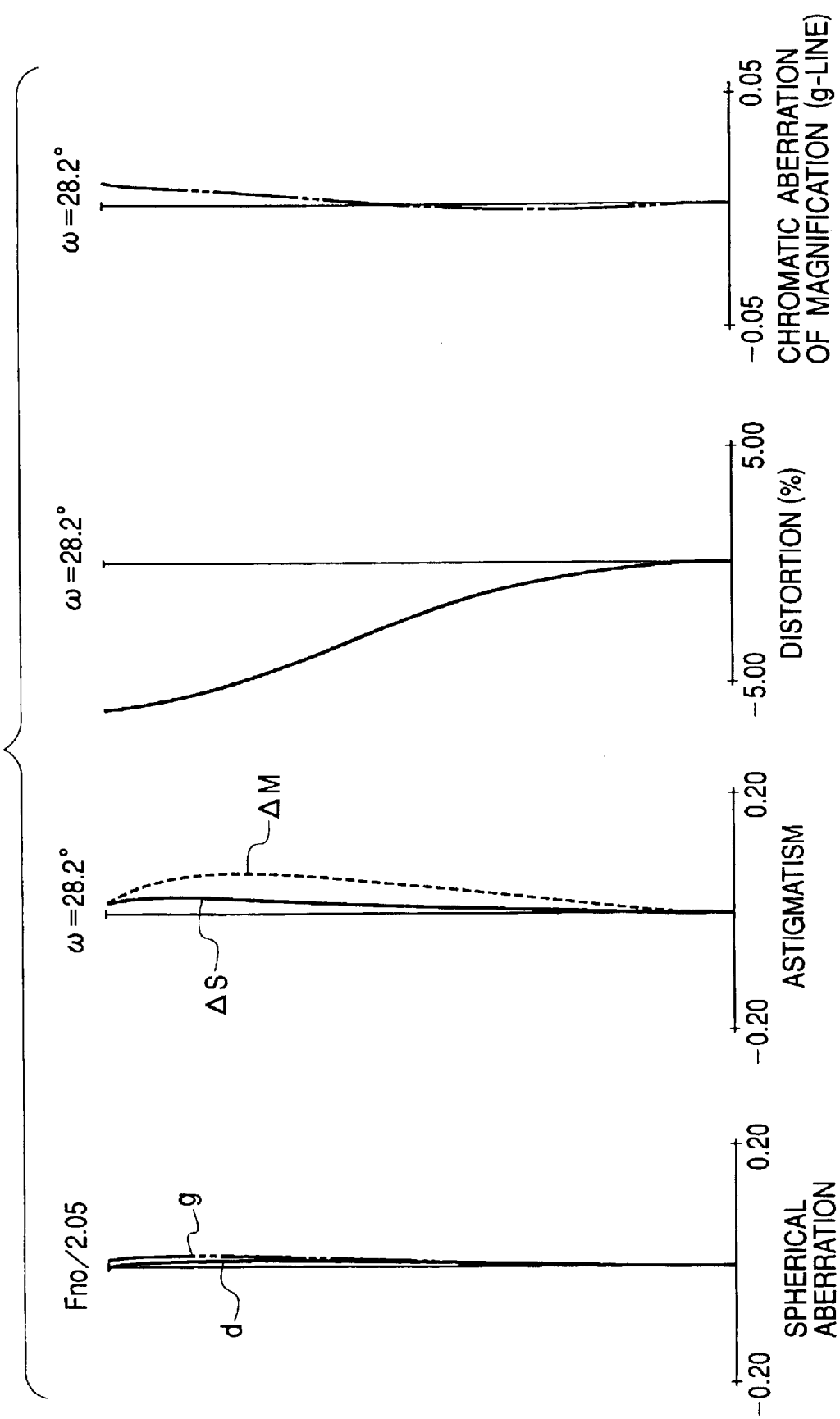
FIG. 22 is a view illustrating aberration charts of the sixth numerical example at its wide-angle end.
Figure 23:
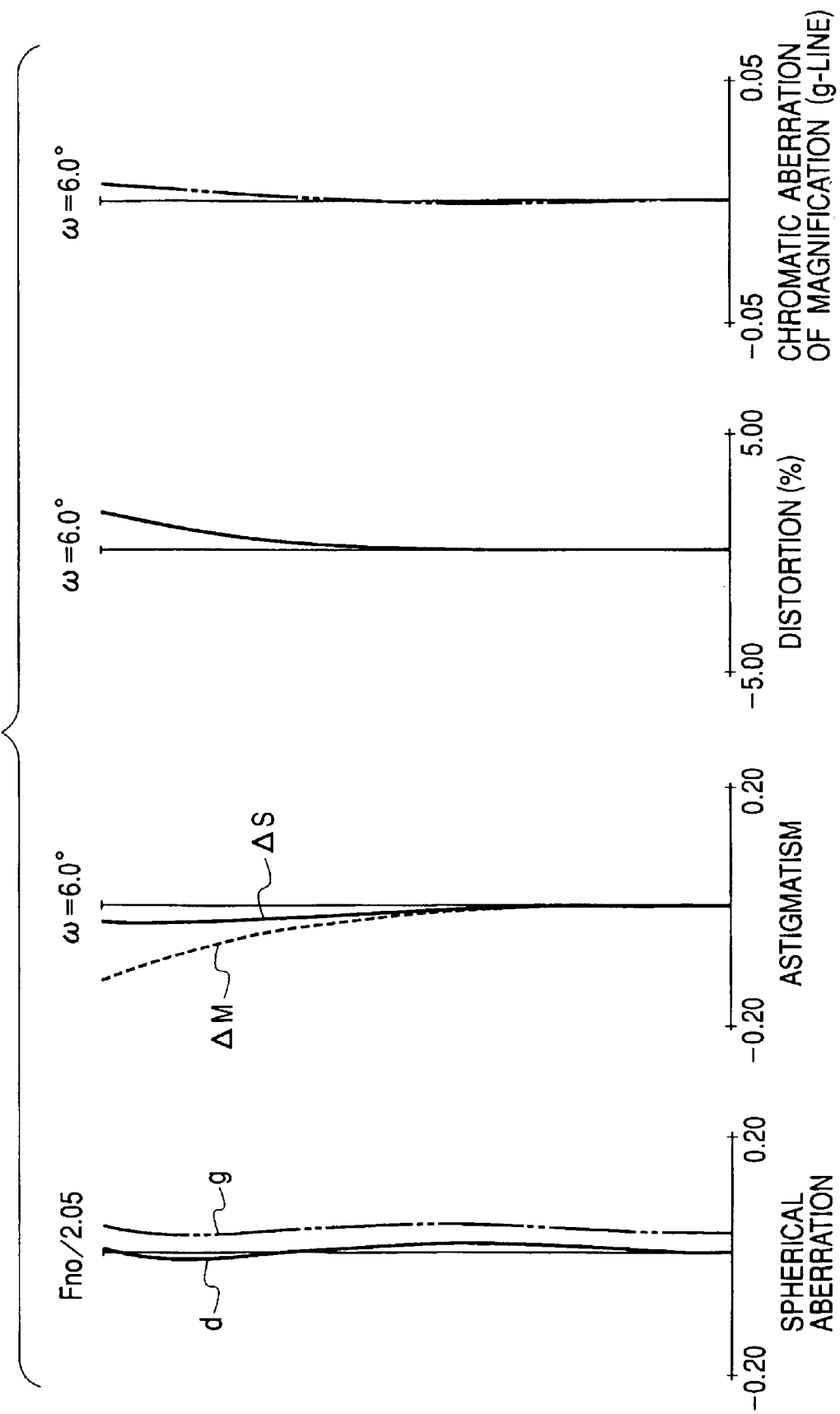
FIG. 23 is a view illustrating aberration charts of the sixth numerical example at its intermediate zoom position.
Figure 24:
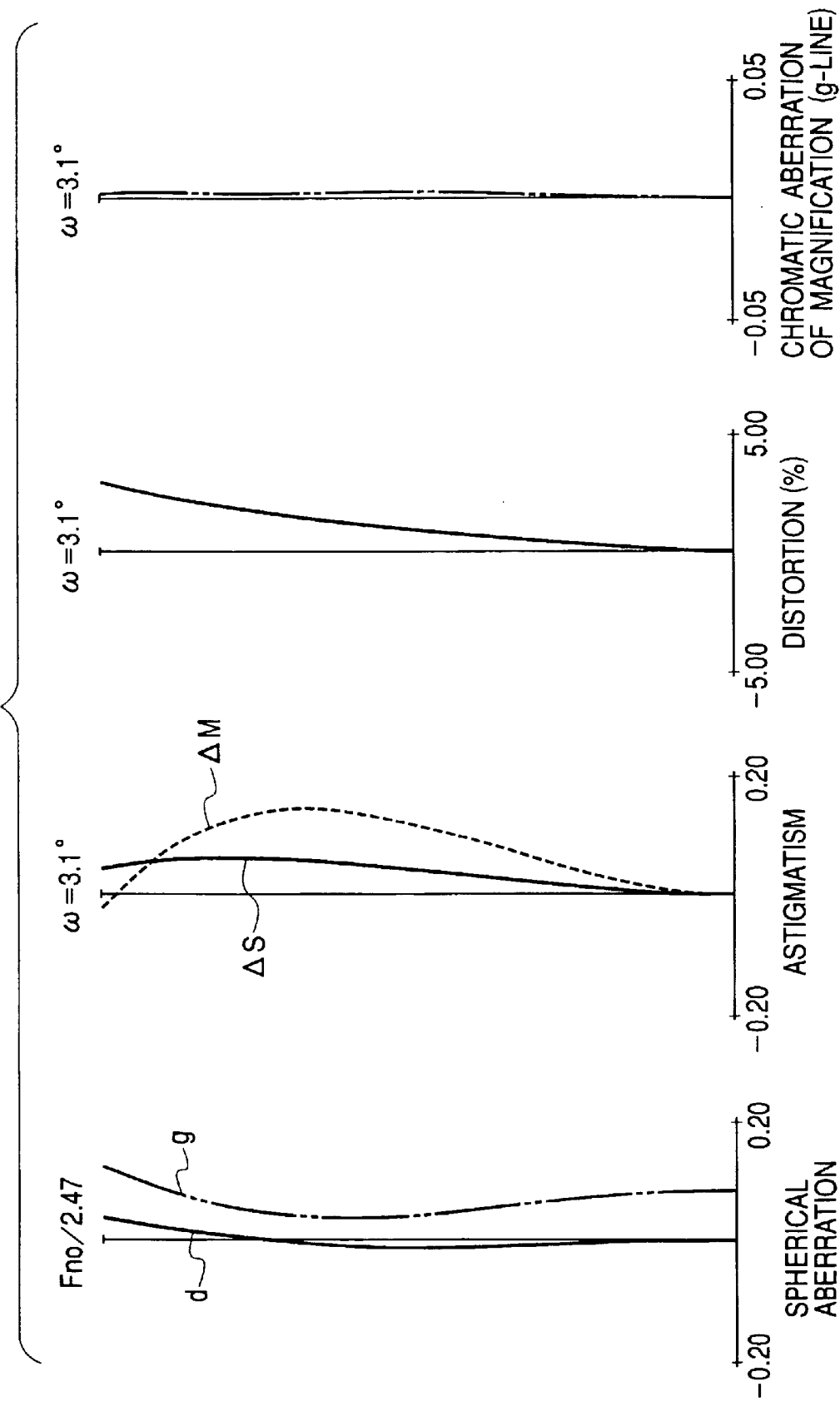
FIG. 24 is a view illustrating aberration charts of the sixth numerical example at its telephoto end.
Figure 25:
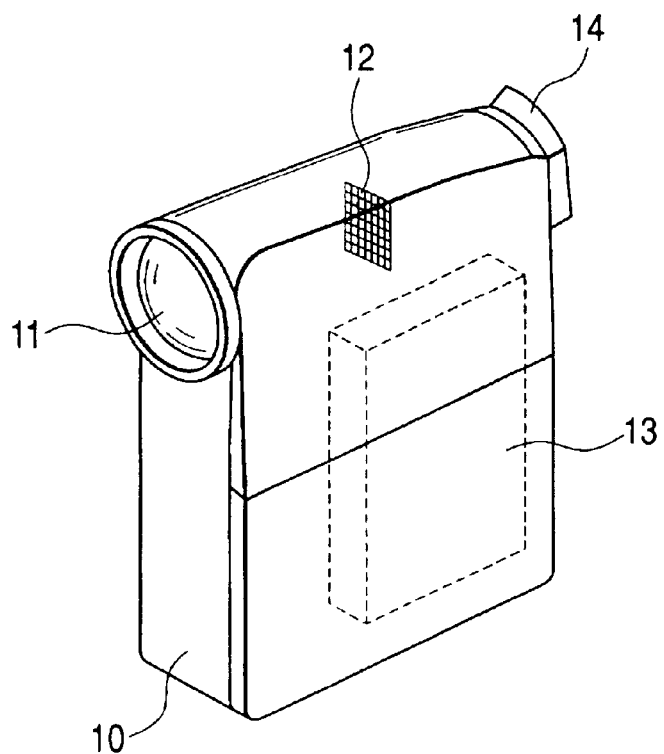
FIG. 25 is a schematic view illustrating a main portion of a video camera.
Figure 26:
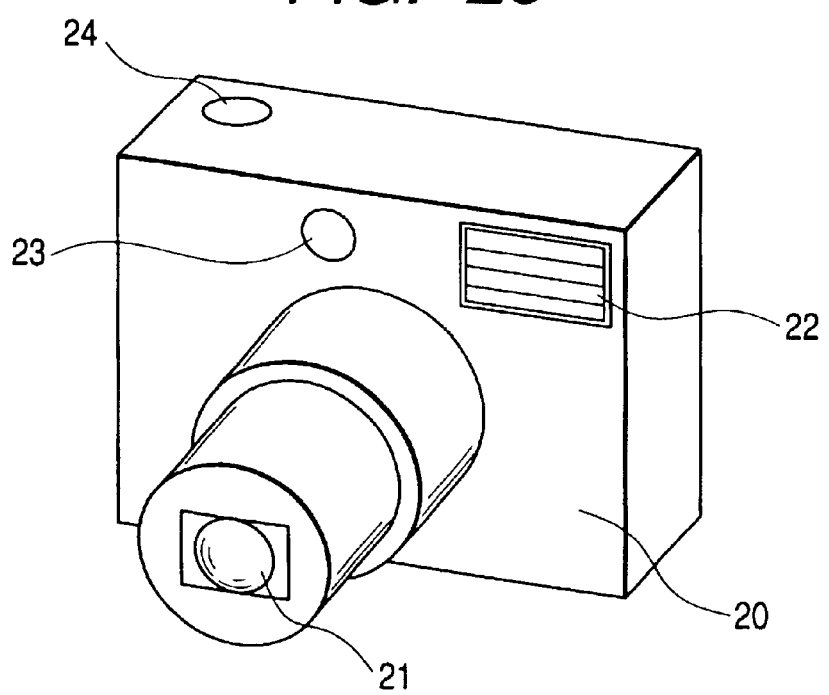
FIG. 26 is a schematic view illustrating a main portion of a digital still camera.

Specifically, FIG. 1 is a cross-sectional view illustrating a main portion of a zoom lens of a first numerical example corresponding to a first embodiment. FIGS. 2 to 4 are views illustrating aberration charts of the zoom lens of the first numerical example at its wide-angle end, at its intermediate zoom position, and at its telephoto end, respectively. FIG. 5 is a cross-sectional view illustrating a main portion of a zoom lens of a second numerical example corresponding to a second embodiment. FIGS. 6 to 8 are views illustrating aberration charts of the zoom lens of the second numerical example at its wide-angle end, at its intermediate zoom position, and at its telephoto end, respectively. FIG. 9 is a cross-sectional view illustrating a main portion of a zoom lens of a third numerical example corresponding to a third embodiment. FIGS. 10 to 12 are views illustrating aberration charts of the zoom lens of the third numerical example at its wide-angle end, at its intermediate zoom position, and at its telephoto end, respectively. FIG. 13 is a cross-sectional view illustrating a main portion of a zoom lens of a fourth numerical example corresponding to a fourth embodiment. FIGS. 14 to 16 are views illustrating aberration charts of the zoom lens of the fourth numerical example at its wide-angle end, at its intermediate zoom position, and at its telephoto end, respectively. FIG. 17 is a cross-sectional view illustrating a main portion of a zoom lens of a fifth numerical example corresponding to a fifth embodiment. FIGS. 18 to 20 are views illustrating aberration charts of the zoom lens of the fifth numerical example at its wide-angle end, at its intermediate zoom position, and at its telephoto end, respectively. FIG. 21 is a cross-sectional view illustrating a main portion of a zoom lens of a sixth numerical example corresponding to a sixth embodiment. FIGS. 22 to 24 are views illustrating aberration charts of the zoom lens of the sixth numerical example at its wide-angle end, at its intermediate zoom position, and at its telephoto end, respectively. FIG. 25 is a schematic view illustrating a video camera using a zoom lens of the present invention and corresponding to a seventh embodiment. FIG. 26 is a schematic view illustrating a digital still camera using a zoom lens of the present invention and corresponding to an eighth embodiment.

In aberration charts of each embodiment, d and g denote d-line and g-line, respectively, ΔM and ΔS denote meridional image surface, and sagittal image surface, respectively, and meridional image surface, sagittal image surface, and chromatic aberration of magnification are represented in the g-line.

(First Embodiment)

In FIG. 1, there are shown a first lens unit L1 having positive power (power is equal to a reciprocal of a focal length) which does not move (stationary) for zooming, a second lens unit L2 having negative power which moves in a direction of the optical axis during zooming, a third lens unit L3 having positive power which does not move (stationary) for zooming, and a fourth lens unit L4 having positive power which moves in the direction of the optical axis during zooming and focussing. In FIG. 1, the left side is the object side (forward side), and the right side is the image side (rearward side). This rule also holds in cross-sectional views of the other embodiments.

An aperture diaphragm (stop) SP is arranged on a forward side of the third lens unit L3. A glass block G, corresponding to a color separating prism, a face plate, a filter, or the like, is also arranged. A solid-state image pickup element (an opto-electric converting element), such as CCD or CMOS, is disposed on an image plane IP. A flare cut stop FP is also arranged.

During the zooming from the wide-angle end to the telephoto end, the second lens unit L2 is moved toward the image side as indicated by an arrow in FIG. 1 such that chief variation of power (power variation) is performed, and at the same time the fourth lens unit L4 is moved along a locus convex toward the object side such that variation of the image plane accompanying the power variation is corrected.

Further, solid curve line 4a and dotted curve line 4b of the fourth lens unit L4 in FIG. 1 indicate moving loci during zooming from the wide-angle end to the telephoto end at the times when infinity object and near object are focussed on, respectively. Since the fourth lens unit L4 is moved along the locus convex toward the object side as discussed above, a space between the third lens unit L3 and the fourth lens unit L4 can be effectively used. Accordingly, the entire length of the lens can be effectively shortened.

In this embodiment, a change of focussing from infinity object to near object at the telephoto end is performed by moving the fourth lens unit L4 forward as indicated by a line 4c in FIG. 1, for example.

In this embodiment, wide-angle end and telephoto end mean zoom positions at which the second lens unit L2 for varying the power are positioned at opposite ends of a mechanically-movable range in the direction of the optical axis, respectively. Those definitions can be similarly applied to the other embodiments of zoom lenses described later.

In this embodiment, the first lens unit L1 and the third lens unit L3 remain stationary during zooming and focussing. These lens units, however, can be moved when necessary. Further, it is possible to move the third lens unit L3 along a locus having a component in a direction perpendicular to the optical axis such that the blur of a photographed image due to handling shift and the like can be stabilized (antivibration).

In this embodiment, the first lens unit L1 is composed, in the order from the object side, a cemented lens convex toward the object side consisting of a negative meniscus lens G1 and a positive lens G2, and a positive meniscus lens G3 in which refractive power of a object-side surface convex toward the object side is stronger than that of an image-side surface convex toward the object side. Further, there is provided, on the cemented surface between the lenses G1 and G2, a diffractive optical portion composed of a diffraction grating which is rotationally symmetrical about the optical axis. Thus, the cemented lens is constructed as a diffractive optical element. The radius of curvature of the cemented surface provided with the diffractive optical portion is appropriately set to satisfy a condition described later, such that the incident angle of light rays incident on the diffractive optical portion (diffractive optical surface) based on each angle of view is within a range of ±15 degrees. Thus, high diffraction efficiency can be achieved over overall power variation range and overall angle of view.

The diffractive optical element used in this embodiment will now be described hereinafter.

Figure 27:
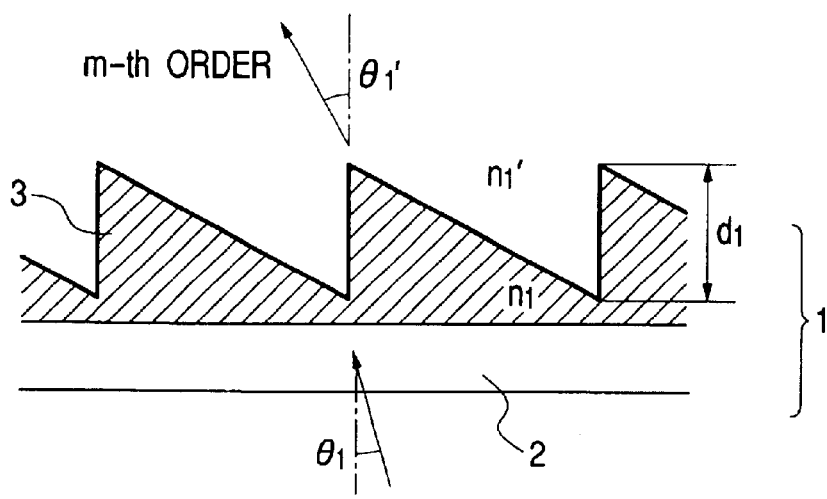
FIG. 27 is a cross-sectional view illustrating a diffractive optical element of a single-layer structure.
Figure 28:
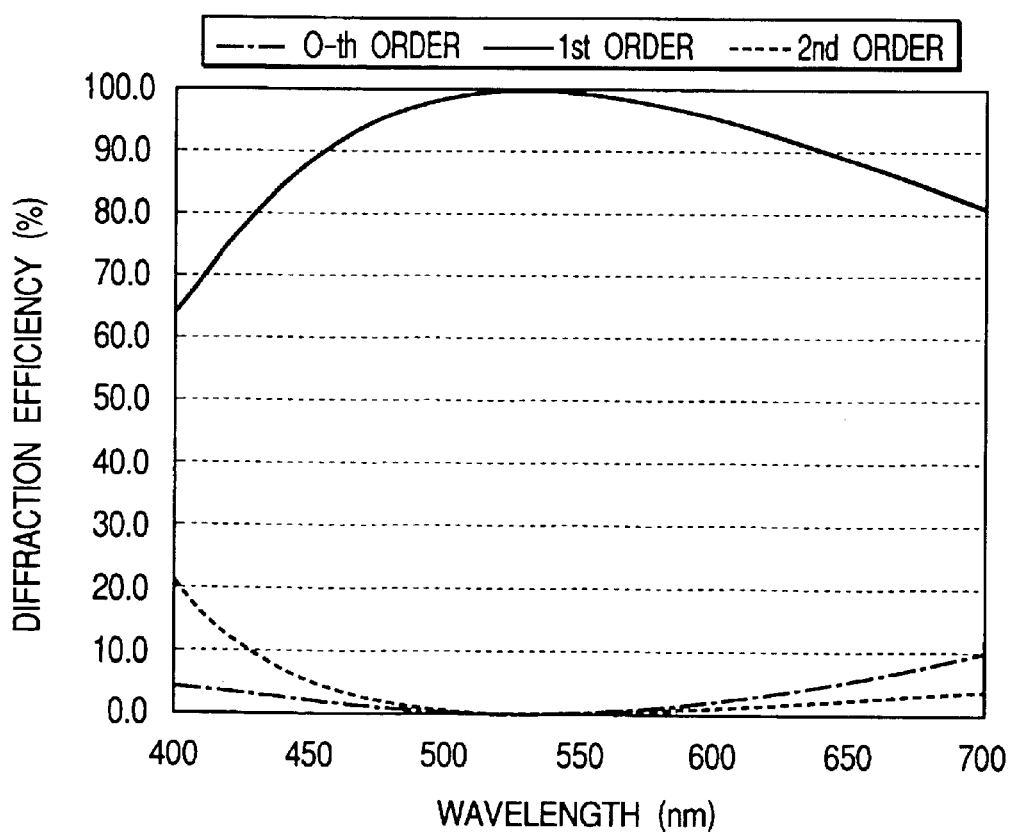
FIG. 28 is a graphical chart illustrating the diffraction efficiency of the single-layer diffractive optical element.

FIG. 27 is an enlarged cross-sectional view illustrating a portion of the diffractive optical portion of a diffractive optical element 1. A diffraction grating 3 composed of a single layer is provided on a substrate (transparent substrate) 2. FIG. 28 shows characteristics of diffraction efficiency of the diffractive optical element 1. In FIG. 28, its abscissa represents the wavelength, and its ordinate represents the diffraction efficiency. The diffraction efficiency means a ratio of the amount of diffracted light relative to the amount of overall transmitting light rays. Here, light reflected at boundary surfaces of the grating and the like are not considered for simplicity.

An optical material of the diffraction grating is an ultraviolet-ray hardening resin (index of refraction nd=1.513, and Abbe number vd=51.0), the grating thickness d1 is set to 1.03 µm, and the diffraction efficiency is adjusted to be maximized for +1st-order diffracted light at a wavelength of 530 nm. That is, designed order is +1st order, and designed wavelength is 530 nm. In FIG. 28, the diffraction efficiency of +1st-order diffracted light is indicated by the solid line.

Further, FIG. 28 also shows diffraction efficiencies of diffraction orders (0-th order, and +2nd order which are (+1±1)-th orders, respectively) near the designed order. As illustrated in FIG. 28, diffraction efficiency in the designed order is maximum near the designed wavelength, and gradually decreases in the other wavelength region.

The amount of a decrease in the diffraction efficiency in that designed order turns to diffracted light in the other orders which causes flare. When diffractive optical elements are provided at plural locations in the optical system, a decrease in the diffraction efficiency at wavelengths other than the designed wavelength may effect a decrease in transmission factor.

Figure 29:
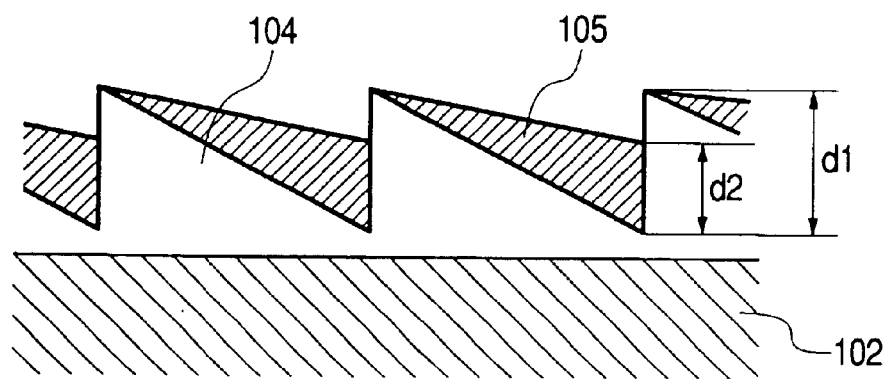
FIG. 29 is a cross-sectional view illustrating a diffractive optical element of a layered structure.
Figure 30:
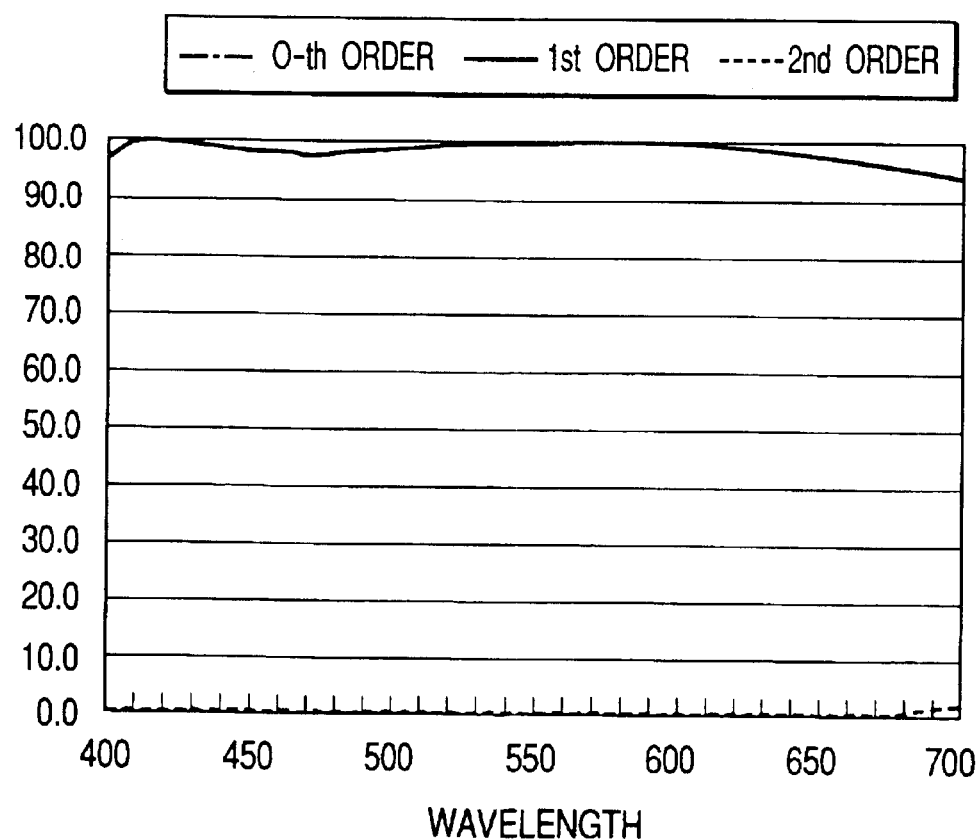
FIG. 30 is a graphical chart illustrating the diffraction efficiency of the layered diffractive optical element.
Figure 31:
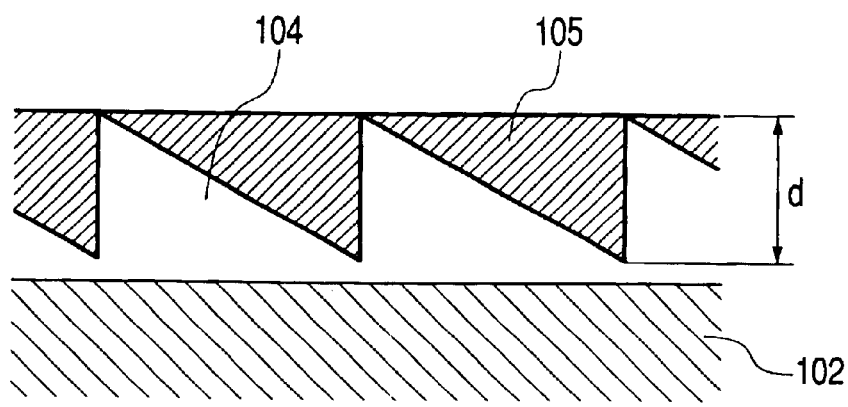
FIG. 31 is a cross-sectional view illustrating another diffractive optical element of a layered structure.

A layered-type diffractive optical element composed of plural layered diffraction gratings of different materials is now described. FIG. 29 is an enlarged cross-sectional view illustrating a portion of the layered-type diffractive optical element. FIG. 30 shows the wavelength dependency of diffraction efficiency of the diffractive optical element for diffracted light in +1st order. In the diffractive optical element of FIG. 29, a first diffraction grating 104 of an ultraviolet-ray hardening resin (index of refraction nd=1.499, and Abbe number vd=54) is formed on a substrate 102, and a second diffraction grating 105 (index of refraction nd=1.598, and Abbe number vd=28) is formed on the first diffraction grating 104. In that combination of materials, the grating thickness d1 of the first diffraction grating 104 is equal to 13.8 µm, and the grating thickness d2 of the second diffraction grating 105 is equal to 10.5 µm.

As is apparent from FIG. 30, when the diffractive optical element of layered diffraction gratings is used, high diffraction efficiency of over 95% can be obtained for diffracted light in the designed order in the overall region of wavelengths used (here, visible region).

In the above-discussed diffractive optical element having the layered structure, a material of the diffraction grating is not limited to the ultraviolet-ray hardening resin. Other plastic materials and the like can also be used. The first layer can be formed directly on the substrate when the substrate allows such fabrication. Further, thicknesses of the gratings are not necessarily different from each other. Layer thicknesses of the two gratings 104 and 105 can be equal if the combination of their materials is suitable therefor. In this case, since no grating profile is formed on a surface, excellent dustproofing characteristic and improved assembling efficiency of the diffractive optical element can be obtained. Further, the two diffraction gratings 104 and 105 are not necessarily brought into close contact with each other, and can be arranged with an air layer between those two gratings.

In this embodiment, each of the substrates 2 and 102 in FIGS. 27 and 29 constitutes at least one lens of the cemented lenses, and the diffraction grating is formed on its lens surface. For example, when the diffraction grating has s single-layer structure as illustrated in FIG. 27, the diffraction grating has only to be formed on one lens surface. When the diffraction grating has a multi-layer structure (two or more than two layers), both lens surfaces need only to be provided with respective diffraction gratings and bonded at their peripheral portions (portions outside the effective diameter) while being aligned with each other. In this embodiment, the diffractive optical portion is provided on a spherical surface of the cemented surface. When the diffraction grating is provided on an aspherical base surface, spherical aberration and coma at the telephoto end can be further corrected preferably.

Those structures of the diffractive optical portion can also be applied similarly to embodiments described later.

As discussed above, since a phase-type diffraction grating of at least one layer constitutes the diffractive optical portion, the diffractive optical portion has a predetermined thickness actually. The thickness is, however, negligible from the viewpoint of geometrical optics, so that the diffractive optical portion is sometimes called a diffractive optical surface (a diffractive surface) when no attention is paid to the thickness.

Namely, the cemented surfaces provided with the diffractive optical portion are arranged in such a manner that a pair of lens surfaces are actually spaced at an interval to an extent negligible from the viewpoint of geometrical optics.

A pair of lens surfaces spaced at an interval to an extent negligible from the viewpoint of geometrical optics is called the cemented surface in this embodiment and followings.

(Second Embodiment)

In a cross-sectional view of FIG. 5, there are shown a first lens unit L1 having positive power which does not move (stationary) for zooming, a second lens unit L2 having negative power which axially moves along the optical axis during zooming, a third lens unit L3 having positive power which does not move (stationary) for zooming, a fourth lens unit L4 having negative power which axially moves along the optical axis during zooming and focussing, and a fifth lens unit L5 having positive power which does not move (stationary) for zooming. Further, an aperture diaphragm (stop) SP, a glass block G corresponding to a face plate, a filter, or the like, and an image plane IP are shown.

During the zooming from the wide-angle end to the telephoto end, the second lens unit L2 is moved toward the image side as indicated by an arrow in FIG. 5 such that chief power variation is performed, and at the same time the fourth lens unit L4 is moved along a locus convex toward the image side such that variation of the image plane position accompanying the power variation is compensated for.

Further, solid curve line 4a and dotted curve line 4b of the fourth lens unit L4 in FIG. 5 indicate moving loci during zooming from the wide-angle end to the telephoto end at the times when infinity object and near object are focussed on, respectively. Since the fourth lens unit L4 is moved along the locus convex toward the image side as discussed above, a space between the fourth lens unit L4 and the fifth lens unit L5 can be effectively used. Accordingly, the entire length of the lens can be effectively shortened.

In the second embodiment, a change of focussing from infinity object to near object at the telephoto end is performed by moving the fourth lens unit L4 rearward as indicated by a line 4c in FIG. 5, for example.

In this embodiment, the first lens unit L1, the third lens unit L3, and the fifth lens unit L5 remain stationary during zooming and focussing. These lens units, however, can be moved when necessary. Further, it is possible to move the third lens unit L3 along a locus having a component in a direction perpendicular to the optical axis such that the blur of a photographed image due to handling shift and the like can be stabilized.

In this embodiment adopting the above-discussed lens structure, a change in the focal length effected by the movement of the second lens unit L2 at the telephoto end can be made larger than that of the first embodiment of the four-unit zoom lens including four lens units of positive, negative, positive and positive refractive powers. Further, the effective diameter of a front lens can be further reduced.

In this embodiment, the first lens unit L1 is composed of, in the order from the object side, a cemented lens convex toward the object side consisting a negative meniscus lens G1 and a positive lens G2, and a positive meniscus lens G3 in which refractive power of a object-side surface convex toward the object side is stronger than that of an image-side surface convex toward the object side. Further, there is provided, on the cemented surface between the lenses G1 and G2, a diffractive optical portion composed of a diffraction grating which is rotationally symmetrical about the optical axis. The radius of curvature of the cemented surface provided with the diffractive optical portion is appropriately set to satisfy a condition described later, such that the angle of light rays incident on the diffractive optical portion based on each angle of view is within a range of ±15 degrees. Thus, high diffraction efficiency can be achieved over overall power variation range and overall angle of view.

(Third Embodiment)

In a cross-sectional view of FIG. 9, there are shown a first lens unit L1 having positive power which does not move (stationary) for zooming, a second lens unit L2 having negative power which axially moves along the optical axis during zooming, a third lens unit L3 having positive power which does not move (stationary) for zooming, a fourth lens unit L4 having negative power which axially moves along the optical axis during zooming, and a fifth lens unit L5 having positive power which axially moves along the optical axis during zooming. Further, an aperture diaphragm (stop) SP, a glass block G corresponding to a face plate, a filter, or the like, and an image plane IP are shown.

During the zooming from the wide-angle end to the telephoto end, the second lens unit L2 is moved toward the image side as indicated by an arrow in FIG. 9, the fourth lens unit L4 is moved along a locus convex toward the image side, and the fifth lens unit L5 is moved along a locus convex toward the object side.

Further, this embodiments adopts a rear focus type in which the fifth lens unit L5 is axially moved along the optical axis during focussing. In this embodiment, the first lens unit L1 and the third lens unit L3 remain stationary during the zooming operation, but they can be moved when necessary.

Solid curve line 5a and dotted curve line 5b of the fifth lens unit L4 in FIG. 9 indicate moving loci during zooming from the wide-angle end to the telephoto end at the times when infinity object and near object are focussed on, respectively.

In this embodiment, a change of focussing from infinity object to near object at the telephoto end is performed by moving the fifth lens unit L5 forward as indicated by a line 5c in FIG. 9, for example.

In this embodiment, the first lens unit L1, and the third lens unit L3 remain stationary during zooming and focussing. Those lens units, however, can be moved when necessary. Further, it is possible to move the third lens unit L3 along a locus having a component in a direction perpendicular to the optical axis such that the blur of a photographed image due to handling shift and the like can be stabilized.

In this embodiment adopting the above-discussed lens structure, a change in the focal length effected by the movement of the second lens unit L2 at the telephoto end can be made larger than that of the first embodiment of the four-unit zoom lens including four lens units of positive, negative, positive and positive refractive powers. Further, the effective diameter of a front lens can be further reduced. In addition, more preferable optical performance is achieved over the overall zoom range by moving three lens units during the zooming operation.

In this embodiment, the first lens unit L1 is composed of, in the order from the object side, a cemented lens convex toward the object side consisting of the negative meniscus lens G1 and the positive lens G2, and a positive meniscus lens G3 in which refractive power of the object-side surface convex toward the object side is stronger than that of the image-side surface convex toward the object side. Further, there is provided, on the cemented surface between the lenses G1 and G2, the diffractive optical portion composed of a diffraction grating which is rotationally symmetrical about the optical axis. The radius of curvature of the cemented surface provided with the diffractive optical portion is appropriately set to satisfy a condition described later, such that the incident angle of light rays incident on the diffractive optical portion based on each angle of view is within a range of ±15 degrees. Thus, high diffraction efficiency can be obtained over overall power variation range and overall angle of view.

As described in the foregoing, in the first to third embodiments, the first lens unit is composed of the cemented lens consisting of the negative meniscus lens and the positive lens, and the positive meniscus lens convex toward the object side, and there is provided, on the cemented surface of the cemented lens, the diffractive optical portion which appropriately sets the phase given to a transmitting wave front, thereby reducing the chromatic aberration occurring in the first lens unit such that the chromatic aberration can be preferably corrected over the overall power variation range.

For example, even if the first lens unit is composed of a positive lens only and provided with a diffractive optical element therein, the chromatic aberration can be suppressed when only chromatic aberrations for two wavelengths, such as d-line and g-line, are considered. However, since the diffractive optical surface has a large anomalous dispersion property, chromatic aberrations for the other wavelengths, i.e., so-called secondary spectrum, increase specially at the telephoto end. Thus, the chromatic aberration cannot be corrected in the overall visible wavelength region.

In the present invention, therefore, achromatic conditions of the dioptric system and the diffractive optical surface are combined in an optimum manner such that chromatic aberrations including secondary spectrum specially at the telephoto end can be preferably corrected to obtain high optical performance.

In order such that the achromatic effect of the first lens unit is shared by the diffractive optical surface, optical power due to the diffraction desirably has a positive value. If the optical power of the diffractive optical surface is negative, the direction of chromatic aberration occurring therein becomes the same as that of an ordinary dioptric system. Accordingly, no achromatic effect occurs in the diffractive optical surface, and the chromatic aberration cannot be sufficiently corrected in the overall optical system.

In general, in a zoom lens with a high zoom ratio of about more than ten (10), the angle of light rays incident on the first lens unit largely changes depending on the zoom position and angle of view. If the angle of light rays incident on the diffractive optical surface varies, the diffraction efficiency is lowered, leading to occurrence of the color flare. In zoom lenses of the first to third embodiments, therefore, a location of the lens surface provided with the diffractive optical portion and its radius of curvature are appropriately adjusted, and each lens unit is appropriately set. Thus, high diffraction efficiency is achieved over overall zoom range and overall angle of view.

Figure 32:
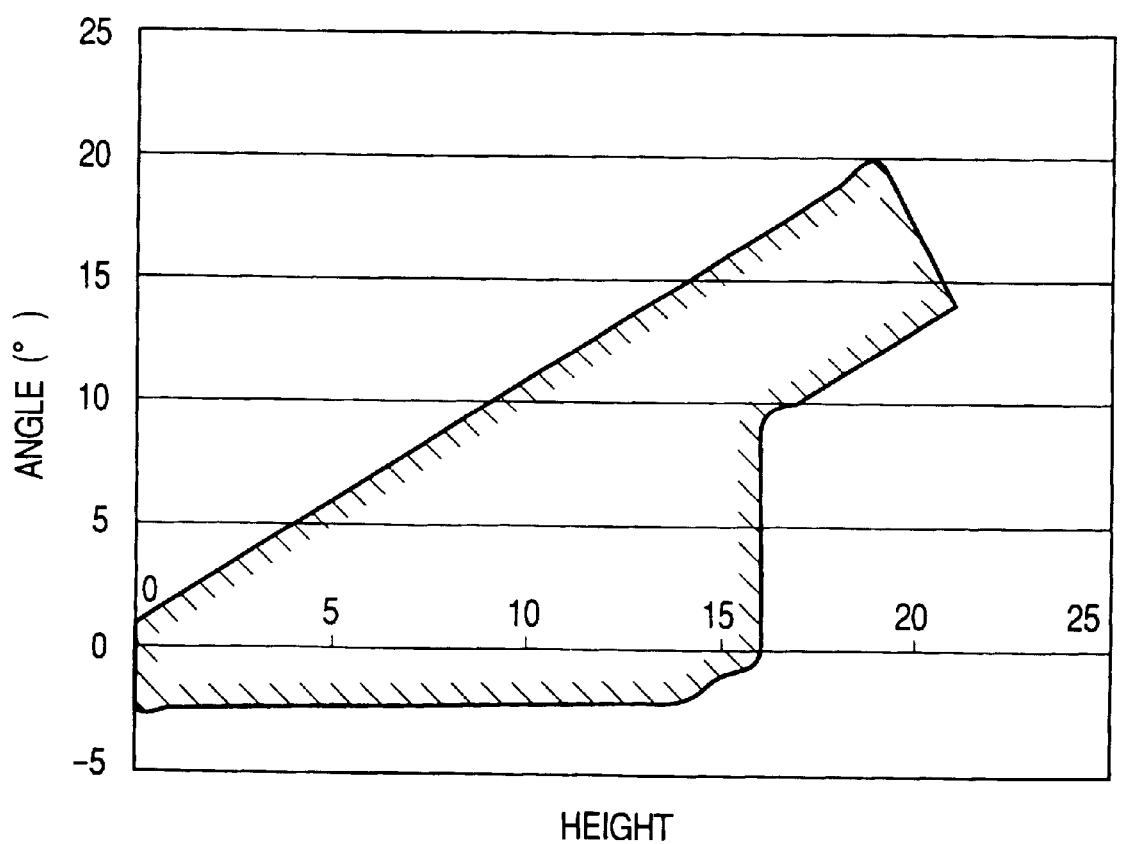
FIG. 32 is a-graphical chart illustrating an incident angle on a diffractive optical surface in the first numerical example.

FIG. 32 illustrates a change in the incident angle on the diffractive optical surface relative to the height from the optical axis in the first embodiment (first numerical example). Its abscissa indicates the height from the optical axis, and ordinate indicates the incident angle. A region within hatched portions is a distribution range of incident light rays.

In FIG. 32, when the shape of the diffraction grating is set such that the diffraction efficiency can be maximized for light rays whose incident angle is zero (0), light rays incident on a portion of the diffractive optical surface neat the height of nineteen (19) have incident angles that are about +20 degrees different from the designed incident angle. In contrast thereto, when the shape of the diffraction grating is set such that the diffraction efficiency can be maximized for light rays whose incident angle on the diffractive optical surface is about nine (9) degrees, a fluctuation in the incident angle can be restricted within a range of about ±11 degrees from the designed incident angle. When a decrease in the diffraction efficiency is considered, a fluctuation in the incident angle on the diffractive optical surface is desirably within a range of about ±15 degrees.

In the first to third embodiments, therefore, the shape of the diffraction grating constituting the diffractive optical portion is optimized such that the diffraction efficiency can be maximized for light rays whose wavelength, order, and incident angle are at 590 nm, in desired one, and within a predetermined range from three (3) degrees to ten (10) degrees, respectively. Thus, necessary and sufficient diffraction efficiency can be obtained over the overall zoom range.

Further, when the diffractive optical portion is divided into plural regions in each of which the shape of the diffraction grating is optimized (for example, by varying an assumed incident angle on the diffractive optical surface between its central region and a peripheral region), a decrease in the diffraction efficiency due to a fluctuation in the incident angle on the diffractive optical surface can be further suppressed. Particularly, in the cases of zoom lenses of the first to third embodiments, it is preferable to make the grating thickness in the peripheral region thinner than that in the central region.

Zoom lenses of the first to third embodiments satisfy the following conditions.

(a-1) The following condition (1) is satisfied:

$$0.5 < RD/f1 < 1.2 \tag{1}$$

where RD is the radius of curvature on the cemented surface provided with the diffractive optical portion, and f1 is the focal length of the first lens unit.

(a-2) The following condition (2) is satisfied:

$$-0.1 < C_2 \cdot (ft/Fnot) < 0 \tag{2}$$

where the phase given to a wave front by the diffractive optical portion is represented by $\phi((h)) = (2\pi/\lambda d) \cdot (C_2 \cdot h^2 + C_4 \cdot h^4 + \ldots + C_{2i} \cdot h^{2i})$, $\lambda d$ is the wavelength of d-line, h is the distance from the optical axis, $C_{2i}$ is the phase coefficient, ft is the focal length of the entire system at the telephoto end, and Fnot is the F-number at the telephoto end.

(a-3) The diffractive optical portion is composed of one or more than one diffraction gratings, and one of these diffraction gratings has a region in which the grating height changes from its central portion to its peripheral portion.

(a-4) The incident angle of light rays incident on each location of the diffractive optical portion is within ±15 degrees over the overall zoom range.

Here, the incident angle of light rays incident on the diffractive optical portion means the incident angle on the lens surface provided with the diffraction grating, the incident angle on the grating surface of the diffraction grating, or the incident angle on the above-discussed diffractive optical surface.

(a-5) In the diffraction order in which the diffraction efficiency of the diffractive optical portion is maximum, the diffraction efficiency of light at a wavelength of 590 nm is maximum when its incident angle on the diffractive optical portion is within a range from three (3) degrees to ten (10) degrees.

(a-6) The following condition (3) is satisfied:

$$1.3 < |f1/(fw \cdot ft)^{1/2}| < 4.0 \tag{3}$$

where f1 is the focal length of the first lens unit, and fw and ft. are focal lengths of the entire system at the wide-angle end and the telephoto end, respectively.

(a-7) When there are arranged, on the image side of the second lens unit, the third lens unit which does not move for zooming, but moves for stabilization of the image in a locus having a component in a direction perpendicular to the optical axis, and at least one lens unit which axially moves in the optical axis during the zooming operation, it is desirable to satisfy the following condition (4):

$$0.5 < |(1-\beta 3) \cdot \beta r| < 3 \tag{4}$$

where β3 is the magnification of the third lens unit at the telephoto end for infinity object, and βr is the magnification of the optical system on the image side of the third lens unit.

Technical significances of the above-discussed conditions will be described hereinafter.

Condition (1) is established for reduction of variation of the incident angle on the diffractive optical portion (diffractive optical surface) introduced on the cemented surface in the first lens unit. Here, "the incident angle on the diffractive optical portion" is considered as the incident angle on the assumption of the diffractive optical portion as the diffractive optical surface from the standpoint of geometrical optics, and means the incident angle on the optical surface (lens surface) provided with the diffractive optical portion in the numerical examples described later.

If the curvature of the diffractive optical surface (cemented surface) goes beyond the lower limit of condition (1), and becomes too strong (large), the incident angle becomes too large specially for on-axis light rays at the telephoto end. Hence, the diffraction efficiency is undesirably lowered. Conversely, if the curvature goes beyond the upper limit, and becomes too weak (small), the incident angle undesirably increases on the periphery at the wide-angle end.

More preferably, the numerical range of condition (1) is set as follows:

$$0.6 < RD/F1 < 1.0 \tag{1a}$$

Condition (2) is established for appropriately setting the phase given to a wave front by the diffractive optical portion, that is, appropriately designing the shape of the diffraction grating constituting the diffractive optical portion.

If the formula in condition (2), i.e., $C_2 \cdot (ft/Fnot)$, goes beyond the lower limit of condition (2), correction of the chromatic aberration in the diffractive optical portion becomes too large. Hence, correction of the chromatic aberration of secondary spectrum undesirably becomes excessive. Conversely, if the formula goes beyond the upper limit, correction of the chromatic aberration of secondary spectrum undesirably runs short.

More preferably, the numerical range of condition (2) is set as follows:

$$-0.005 < C_2 \cdot (ft/Fnot) < 0 \tag{2a}$$

Condition (3) is relevant to the refractive power of the first lens unit, and established for effectively obtaining a desired ratio of power variation while variation of aberrations accompanying the power variation is reduced. If the refractive power of the first lens unit goes beyond the lower limit, and becomes too strong, correction of spherical aberration and coma appearing at the telephoto end becomes difficult to achieve though the structure can be advantageously made small in size. Conversely, if the refractive power of the first lens unit goes beyond the upper limit, the amount of movement of the second lens unit during the zooming operation becomes too large. Thus, the entire length of the lens is likely to increase.

More preferably, the numerical range of condition (3) is set as follows:

$$1.8 < |f1/(fw \cdot ft)^{1/2}| < 3.0 \tag{3a}$$

Condition (4) is relevant to the imaging magnification of the third lens unit. Beyond the lower limit of condition (4), the amount of movement of the third lens unit needed at the time of antivibration becomes undesirably large. Conversely, beyond the upper limit, sensitivity of the third lens unit becomes too large, and control at the time of antivibration undesirably becomes difficult to perform. More preferably, the numerical range of condition (4) is set as follows:

$$0.8 < |(1-\beta 3) \cdot \beta \text{r}| < 2.0 \tag{4a}$$

In the following, description will now be made to first to third numerical examples which correspond to numerical data of zoom lenses of the first to third embodiments, respectively. In each numerical example, i designates the order of a surface from the object side, Ri designates the radius of curvature of the i-th surface from the object side, Di designates the gap or distance between the i-th surface and the (i+1)-th surface from the object side, Ni and vi designate the index of refraction and the Abbe number of the i-th optical member, respectively, and f, Fno and 2ω are the focal length of the entire system, the F-number, and the angle of view at the time when infinity object is focussed on, respectively.

Further, two surfaces closest to the image plane in each numerical example are surfaces constituting the glass block G corresponding to color separating prism, face plate, various filters, or the like.

The shape of the aspherical surface is expressed as follows, in the coordinates with the X axis in the optical axis and the H axis in a direction perpendicular to the optical axis, where the direction of travel of light is taken as positive, R is the paraxial radius of curvature, k is eccentricity, and B, C and D are aspherical coefficients, respectively.

$$X = (H^2/R)/\{1 + [1-(1+k)(H/R)^2]^{1/2}\} + BH^4 + CH^6 + DH^8$$

The diffractive optical surface (diffraction surface) is expressed by giving the phase coefficient $C_{2i}$ of the above-discussed phase function of $\phi(h) = (2\pi/\lambda d) \cdot (C_2 \cdot h^2 + C_4 \cdot h^4 + \ldots + C_{2i} \cdot h^{2i})$.

In values of the aspherical coefficients, the notation [e-Z] means $[10^{-z}]$. Table 1 lists the relationship between each of the above-discussed conditions and values in each of the numerical examples.

First Numerical Example
f = 7.83 to 76.00  Fno = 2.88 to 4.0  2ω = 59.7° to 6.8°

| R1 = 63.640 | D1 = 2.00 | N1 = 1.846660 | v1 = 23.9 |
|---|---|---|---|
| R2 = 39.000 (diffraction surface) | D2 = 7.10 | N2 = 1.603112 | v2 = 60.7 |
| R3 = 2270.562 | D3 = 0.20 | N3 = 1.696797 | v3 = 55.5 |
| R4 = 37.500 | D4 = 4.20 | N4 = 1.834000 | v4 = 37.2 |
| R5 = 99.491 | D5 = variable | N5 = 1.743997 | v5 = 44.8 |
| R6 = 55.599 | D6 = 1.00 | N6 = 1.846660 | v6 = 23.9 |
| R7 = 8.768 | D7 = 5.00 | N7 = 1.666718 | v7 = 48.3 |
| R8 = −26.341 | D8 = 0.90 | N8 = 1.583126 | v8 = 59.4 |
| R9 = 373.706 | D9 = 0.45 | N9 = 1.761821 | v9 = 26.5 |
| R10 = 15.696 | D10 = 3.30 | N10 = 1.516330 | v10 = 64.1 |
| R11 = −77.415 | D11 = 0.70 | N11 = 1.772499 | v11 = 49.6 |
| R12 = 19.552 | D12 = variable | N12 = 1.846660 | v12 = 23.8 |
| R13 = aperture diaphragm | D13 = 2.70 | N13 = 1.583126 | v13 = 59.4 |
| R14 = 14.364 (aspherical surface) | D14 = 2.80 | N14 = 1.516330 | v14 = 64.1 |
| R15 = 54.7 | D15 = 3.48 | | |
| R16 = 45.123 | D16 = 0.75 | | |
| R17 = 17.413 | D17 = 0.58 | | |
| R18 = 44.914 | D18 = 2.40 | | |
| R19 = −22.358 | D19 = 1.69 | | |
| R20 = ∞ | D20 = variable | | |
| R21 = 16.227 | D21 = 2.60 | | |
| R22 = −474.882 | D22 = 0.60 | | |
| R23 = 24.619 | D23 = 0.62 | | |
| R24 = 168.283 | D24 = 2.80 | | |
| R25 = −48.667 (aspherical surface) | D25 = variable | | |
| R26 = ∞ | D26 = 3.10 | | |
| R27 = ∞ | | | |

| focal length | 7.83 | 35.95 | 76.00 |
|---|---|---|---|
| variable distance | | | |
| D5 | 0.90 | 25.13 | 31.96 |
| D12 | 33.01 | 8.78 | 1.95 |
| D20 | 12.79 | 7.01 | 12.32 |
| D25 | 4.00 | 9.78 | 4.47 |
| D27 | 12.79 | 12.79 | 12.79 | aspherical coefficient

R14 k = −5.42502e+00  B = 1.81048e−4  C = −1.78033e−6  D = 1.47258e−8
R25 k = −6.34392e+01  B = −3.40548e−05  C = 5.31934e−7  D = −1.98181e−9 phase coefficient

C2 = −8.47114e−5   C4 = 9.04678e−9

Second Numerical Example
f = 7.50 to 72.50  Fno = 2.88 to 3.25  2ω = 61.9° to 7.1°

| R1 = 85.894 | D1 = 1.70 | N1 = 1.846660 | v1 = 23.8 |
|---|---|---|---|
| R2 = 44.352 (diffraction surface) | D2 = 5.70 | N2 = 1.603112 | v2 = 60.6 |
| R3 = −264.922 | D3 = 0.20 | N3 = 1.696797 | v3 = 55.5 |
| R4 = 35.610 | D4 = 3.70 | N4 = 1.834807 | v4 = 42.7 |
| R5 = 95.547 | D5 = variable | N5 = 1.712995 | v5 = 53.9 |
| R6 = 111.400 | D6 = 1.00 | N6 = 1.846660 | v6 = 23.8 |
| R7 = 9.673 | D7 = 4.80 | N7 = 1.804000 | N7 = 46.6 |
| R8 = −28.868 | D8 = 0.85 | N8 = 1.696797 | N8 = 55.5 |
| R9 = 131.179 | D9 = 0.55 | N9 = 1.603112 | N9 = 60.6 |

-continued

Second Numerical Example
f = 7.50 to 72.50 Fno = 2.88 to 3.25 2ω = 61.9° to 7.1°

| | | | |
|---|---|---|---|
| R10 = 18.009 | D10 = 3.60 | N10 = 1.846660 | N10 = 23.8 |
| R11 = −112.832 | D11 = 0.75 | N11 = 1.688931 | N11 = 31.1 |
| R12 = 31.123 | D12 = variable | N12 = 1.516330 | N12 = 64.1 |
| R13 = aperture diaphragm | D13 = 2.30 | N13 = 1.693501 | N13 = 53.2 |
| R14 = 62.110 | D14 = 2.20 | N14 = 1.487490 | N14 = 70.2 |
| R15 = −34.200 | D15 = 0.80 | N15 = 1.761821 | N15 = 26.5 |
| R16 = 27.918 | D16 = 2.90 | N16 = 1.516330 | N16 = 64.2 |
| R17 = −18.879 | D17 = 0.60 | | |
| R18 = −75.714 | D18 = Variable | | |
| R19 = −21.892 (aspherical surface) | D19 = 2.10 | | |
| R20 = −11.422 | D20 = 0.70 | | |
| R21 = 27.434 | D21 = variable | | |
| R22 = 48.792 | D22 = 3.00 | | |
| R23 = −21.168 | D23 = 0.20 | | |
| R24 = 18.847 | D24 = 3.20 | | |
| R25 = −19.321 | D25 = 0.70 | | |
| R26 = 44.630 (aspherical surface) | D26 = 5.00 | | |
| R27 = ∞ | D27 = 3.06 | | |
| R28 = ∞ | | | |

| focal length variable distance | 7.50 | 40.99 | 72.50 |
|---|---|---|---|
| D5 | 1.00 | 24.97 | 31.73 |
| D12 | 32.53 | 8.56 | 1.80 |
| D18 | 2.87 | 10.82 | 3.61 |
| D21 | 12.12 | 4.17 | 11.38 | aspherical coefficient

R19 k = 3.09577  B = 2.72742e−05  C = 2.04075e−07  D = −5.21574e−09
R26 k = 1.27888e−01  B = 2.00780e−05  C = 5.82644e−08  D = 7.55500e−10
phase coefficient C2 = −7.49581e−5   C4 = 2.41151e−8

Third Numerical Example
f = 7.50 to 72.50 Fno = 2.88 to 3.25 2ω = 61.9° to 7.1°

| | | | |
|---|---|---|---|
| R1 = 84.280 | D1 = 1.80 | N1 = 1.846660 | ν1 = 23.8 |
| R2 = 45.648 (diffraction surface) | D2 = 6.20 | N2 = 1.583126 | ν2 = 59.4 |
| R3 = −317.410 | D3 = 0.20 | N3 = 1.696797 | ν3 = 55.5 |
| R4 = 34.873 | D4 = 3.70 | N4 = 1.834807 | ν4 = 42.7 |
| R5 = 76.562 | D5 = variable | N5 = 1.696797 | ν5 = 55.5 |
| R6 = 53.410 | D6 = 1.00 | N6 = 1.846660 | ν6 = 23.8 |
| R7 = 9.463 | D7 = 5.80 | N7 = 1.834807 | ν7 = 42.7 |
| R8 = −27.953 | D8 = 0.85 | N8 = 1.696797 | ν8 = 55.5 |
| R9 = 510.646 | D9 = 0.55 | N9 = 1.603112 | ν9 = 60.6 |
| R10 = 17.287 | D10 = 3.60 | N10 = 1.846660 | ν10 = 23.8 |
| R11 = −180.045 | D11 = 0.75 | N11 = 1.688931 | ν11 = 31.1 |
| R12 = 25.958 | D12 = variable | N12 = 1.516330 | ν12 = 64.1 |
| R13 = aperture diaphragm | D13 = 2.30 | N13 = 1.693501 | ν13 = 53.2 |
| R14 = 61.886 | D14 = 2.20 | N14 = 1.487490 | ν14 = 70.2 |
| R15 = −41.592 | D15 = 0.80 | N15 = 1.761821 | ν15 = 26.5 |
| R16 = 55.431 | D16 = 2.90 | N16 = 1.583126 | ν16 = 59.4 |
| R17 = −15.897 | D17 = 0.60 | N17 = 1.516330 | ν17 = 64.2 |
| R18 = −38.085 | D18 = variable | | |
| R19 = −21.615 (aspherical surface) | D19 = 2.10 | | |
| R20 = −11.904 | D20 = 0.70 | | |
| R21 = 64.225 | D21 = variable | | |
| R22 = 25.796 | D22 = 3.00 | | |

-continued

Third Numerical Example
f = 7.50 to 72.50 Fno = 2.88 to 3.25 2ω = 61.9° to 7.1°

| | |
|---|---|
| R23 = −38.943 | D23 = 0.20 |
| R24 = 18.486 | D24 = 3.20 |
| R25 = −34.275 | D25 = 0.70 |
| R26 = 21.453 | D26 = 0.80 |
| R27 = −214.664 | D27 = 1.80 |
| R28 = −47.408 (aspherical surface) | D28 = variable |
| R29 = ∞ | D29 = 3.06 |
| R30 = ∞ | |

| focal length variable distance | 7.50 | 38.84 | 72.50 |
|---|---|---|---|
| D5 | 1.00 | 26.82 | 34.11 |
| D12 | 34.91 | 9.08 | 1.80 |
| D18 | 2.87 | 10.74 | 7.33 |
| D21 | 13.07 | 3.00 | 8.08 |
| D28 | 3.00 | 5.21 | 3.53 | aspherical coefficient

R19 k = −8.27969e−01  B = −1.44386e−05  C = 6.87116e−09  D = −1.44776e−09
R28 k = −1.47336e+01  B = 3.72234e−05  C = 1.90091e−07  D = −2.56973e−09
phase coefficient C2 = −6.95842e−5   C4 = 1.04394e−8

TABLE 1

| Condition | 1st Example | 2nd Example | 3rd Example |
|---|---|---|---|
| (1) RD/f1 | 0.7219 | 0.8490 | 0.7912 |
| (2) C2 · (ft/Fnot) | −1.144E−03 | −1.672E−03 | −1.235E−03 |
| (3) \|f1/(fw · ft)½\| | 2.214 | 2.240 | 2.474 |
| (4) \|(1 − β3) · βr\| | 0.9795 | 1.331 | 1.266 |

Fourth to sixth embodiments (corresponding to fourth to sixth embodiments described later) will now be described. In the fourth to sixth embodiments, the diffractive optical portion is provided on the cemented surface in the second lens unit, different from the first to third embodiments.

In cross-sectional views of fourth to sixth embodiments (FIGS. 13, 17 and 21), there are shown a first lens unit L1 having positive refractive power, a second lens unit L2 having negative refractive power, a third lens unit L3 having positive refractive power, and a fourth lens unit L4 having positive refractive power. An aperture diaphragm (stop) SP is arranged on a forward side of the third lens unit L3. The aperture diaphragm SP moves together with the third lens unit L3 during the zooming operation. A glass block G, corresponding to a color separating prism, a face plate, various filters, or the like, is also arranged. A solid-state image pickup element (an opto-electric converting device), such as CCD or CMOS, or a photosensitive material, such as a film, is disposed on an image plane IP.

(Fourth Embodiment)

In the fourth embodiment illustrated in FIG. 13, during the zooming from the wide-angle end to the telephoto end, the first and third lens units L1 and L3 are moved toward the object side while the second lens unit L2 is moved along a locus convex toward the image side such that the power is varied, and the fourth lens unit L4 is moved along a locus including a locus part convex toward the object side such that variation of the image plane accompanying the power variation is corrected.

Further, this embodiment adopts a rear focus type in which the fourth lens unit L4 is axially moved along the optical axis during focussing. Therefore, moving loci of the fourth lens unit L4 during zooming differ depending on the distance to an object. Solid curve line 4a and dotted curve line 4b of the fourth lens unit L4 in FIG. 13 indicate moving loci during zooming from the wide-angle end to the telephoto end at the times when infinity object and near object are focussed on, respectively. Since the fourth lens unit L4 is moved along the locus convex toward the object side during the zooming from the wide-angle end to the telephoto, as indicated by curve lines 4a and 4b, a space between the third lens unit L3 and the fourth lens unit L4 can be effectively used. Accordingly, the entire length of the lens can be effectively shortened.

In the fourth embodiment, a change of focussing from infinity object to near object at the telephoto end is performed by moving the fourth lens unit L4 forward as indicated by a line 4c in FIG. 13, for example.

In this embodiment, during the zooming, the third lens unit L3 is moved toward the object side such that chief power variation is effected, and at the same time the first lens unit L1 having positive refractive power is moved toward the object side such that the second lens unit L2 can also effect the power variation. Thus, a ratio of power variation of about five (5) can be readily obtained without increasing refractive powers of the first lens unit L1 and the second lens unit L2 too much.

Further, in this embodiment, the second lens unit L2 is composed of, in the order from the object side, a cemented lens consisting a negative lens G21 and a negative meniscus lens G22 convex toward the object side, and a positive meniscus lens G23 which has a convex surface with a larger absolute value of refractive power on the object side. Further, there is provided, on the cemented surface convex toward the object side between the negative lenses G21 and G22, a diffractive optical portion composed of a phase-type diffraction grating which is rotationally symmetrical about the optical axis.

As discussed above, since the phase-type diffraction grating constitutes the diffractive optical portion, the diffractive optical portion has a predetermined thickness actually. The thickness is, however, negligible from the viewpoint of geometrical optics, so that the diffractive optical portion is sometimes called a diffractive optical surface or diffraction surface when no attention is paid to the thickness. Though the diffractive optical portion is provided on the spherical cemented surface in the fourth embodiment, spherical aberration and coma at the telephoto end can be further corrected preferably when a base surface of the diffractive optical portion is made aspherical. This also holds similarly in fifth and sixth embodiments described later.

(Fifth Embodiment)

In the fifth embodiment illustrated in FIG. 17, during the zooming from the wide-angle end to the telephoto end, the second lens unit L2 is moved toward the image side while the third lens unit L3 is moved toward the object side, as indicated by arrows in FIG. 17, such that power is varied, and at the same time the fourth lens unit L4 is moved along a locus including a locus part convex toward the object side such that variation of the image plane accompanying the power variation is corrected.

Further, this embodiment adopts a rear-focus type in which the fourth lens unit L4 is axially moved along the optical axis during focussing. Therefore, moving loci of the fourth lens unit L4 during zooming differ depending on the distance to an object. Solid curve line 4a and dotted curve line 4b of the fourth lens unit L4 in FIG. 17 indicate moving loci during zooming from the wide-angle end to the telephoto end at the times when infinity object and near object are focussed on, respectively. Since the fourth lens unit L4 is moved along the locus convex toward the object side during the zooming from the wide-angle end to the telephoto, as indicated by curves 4a and 4b, a space between the third lens unit L3 and the fourth lens unit L4 can be effectively used. Accordingly, the entire length of the lens can be effectively shortened.

In the fifth embodiment, a change of focussing from infinity object to near object at the telephoto end is performed by moving the fourth lens unit L4 forward as indicated by a line 4c in FIG. 17, for example.

In the fifth embodiment, the first lens unit L1 is not moved for zooming such that a barrel structure can be simplified. Further, the third lens unit L3 is moved toward the object side during zooming such that the third lens unit L3 effects chief power variation.

Further, in this embodiment, the second lens unit L2 is composed of, in the order from the object side, a cemented lens consisting a negative lens G21 and a negative meniscus lens G22 convex toward the object side, and a positive meniscus lens G23 which has a convex surface with a larger absolute value of refractive power on the object side. Further, there is provided, on the cemented surface (lens surface) convex toward the object side between the negative lenses G21 and G22, a diffractive optical portion composed of a phase-type diffraction grating which is rotationally symmetrical about the optical axis. Thus, the cemented lens constitutes a diffractive optical element.

(Sixth Embodiment)

In the sixth embodiment illustrated in FIG. 21, during the zooming from the wide-angle end to the telephoto end, the second lens unit L2 is moved toward the image side as indicated by an arrow in FIG. 21 such that the power is varied, and at the same time the fourth lens unit L4 is moved along a locus including a locus part convex toward the object side such that variation of the image plane accompanying the power variation is corrected.

Further, this embodiment adopts a rear focus type in which the fourth lens unit L4 is axially moved along the optical axis during focussing. Therefore, moving loci of the fourth lens unit L4 during zooming differ depending on the distance to an object. Solid curve line 4a and dotted curve line 4b of the fourth lens unit L4 in FIG. 21 indicate moving loci during zooming from the wide-angle end to the telephoto end at the times when infinity object and near object are focussed on, respectively. Since the fourth lens unit L4 is moved along the locus convex toward the object side during the zooming from the wide-angle end to the telephoto, as indicated by curve lines 4a and 4b, a space between the third lens unit L3 and the fourth lens unit L4 can be effectively used. Accordingly, the entire length of the lens can be effectively shortened.

Though the first lens unit L1 and the third lens unit L3 remain stationary during zooming and focussing in the sixth embodiment, those lenses can be moved when necessary.

In the sixth embodiment, the second lens unit L2 is composed of, in the order from the object side, a negative lens G21, a negative lens G22 which has a concave surface with a larger absolute value of refractive power on the image side, and a negative lens G23 which has a concave surface with a larger absolute value of refractive power on the object side. Further, the negative lenses G21 and G22 are cemented to constitute a cemented lens, there is provided, on the cemented surface convex toward the object side, a diffractive optical portion composed of a phase-type diffraction grating which is rotationally symmetrical about the optical axis. Thus, the cemented lens constitutes a diffractive optical element.

Further, in the sixth embodiment, the first lens unit L1 is composed of a cemented lens of a negative lens and a positive lens, and there is also provided, on the cemented surface convex toward the object side, another diffractive optical portion composed of a phase-type diffraction grating which is rotationally symmetrical about the optical axis ordinarily, in a four-unit zoom lens consisting of four lens units with a zoom ratio of about ten (10), the first lens unit L1 is composed of a negative lens and two positive lenses, and the second lens unit L2 is composed of two negative lenses and a positive lens. In contrast thereto, in the zoom lens of the sixth embodiment, two diffractive optical surfaces are used, such that the first lens unit L1 can be composed of a positive lens and a negative lens, and that the second lens unit L2 can be composed of a negative lens only. Thus, the entire length of the lens can be readily shortened. Further, the second lens unit L2 can also have a function of reducing an anomalous dispersion effect which excessively occurs when a diffractive optical surface with a large optical power (a reciprocal of a focal length) is provided in the first lens unit L1.

Even when the first lens unit L1 is composed of a positive lens only as in the fourth and fifth embodiments, chromatic aberrations can be preferably corrected only for two wavelengths, such as d-line and g-line, by providing the diffractive optical portion on an appropriate surface of the second lens unit L2.

On the other hand, in the sixth embodiment, achromatic conditions of the dioptric system and the diffraction system are combined in an optimum manner such that chromatic aberrations for wavelengths other than the two wavelengths at the telephoto end, i.e., so-called secondary spectrum, can be more preferably corrected over the overall visible wavelength range. In the zoom lens of the sixth embodiment, accordingly, chromatic aberrations including secondary spectrum specially at the telephoto end can be preferably corrected to obtain high optical performance.

In order such that the achromatic effect of the first lens unit L1 is shared by the diffractive optical portion, optical power of the diffractive optical portion desirably has a positive value. If the optical power of the diffractive optical portion is negative, the direction of chromatic aberration occurring therein becomes the same as that of an ordinary dioptric system. Accordingly, no achromatic effect occurs in the diffractive optical portion, and chromatic aberration cannot be sufficiently corrected in the overall optical system.

In zoom lenses of the fourth to sixth embodiments, the incident angle of light rays incident on the second lens unit L2 changes depending on the zoom position and the angle of view. In the fourth to sixth embodiments, therefore, the radius of curvature of a surface provided with the diffractive optical portion is appropriately adjusted such that high diffraction efficiency can be achieved over the overall zoom range and the overall angle of view. Specifically, zoom lenses of the fourth to sixth embodiments satisfy the following condition (5):

$$-2.8 < RD/f2 < -1.2 \tag{5},$$

where RD is the radius of curvature of the cemented surface provided with the diffractive optical portion in the second lens unit L2, and f2 is the focal length of the second lens unit L2.

If the curvature of the cemented surface, or diffractive optical surface, goes beyond the lower limit of condition (5) and becomes too strong (large), the incident angle becomes too large specially for on-axis light rays at the telephoto end. Hence, the diffraction efficiency is undesirably lowered.

Conversely, if the curvature goes beyond the upper limit and becomes too weak (small), the incident angle undesirably increases on the periphery at the wide-angle end.

More preferably, the numerical range of condition (5) is set as follows:

$$-2.5 < RD/F2 < -1.5 \tag{5a}.$$

Figure 33:
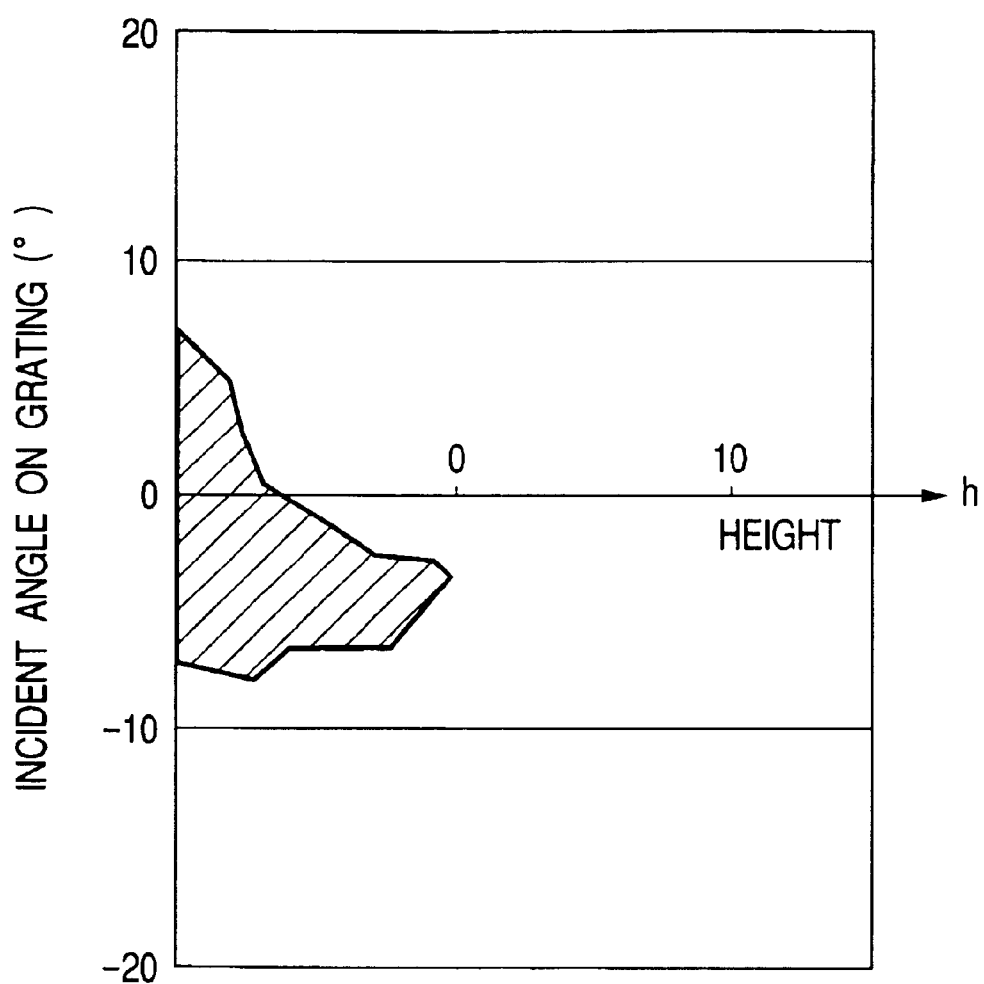
FIG. 33 is a graphical chart illustrating an incident angle on a diffractive optical surface in the fourth numerical example.

FIG. 33 exemplifies a change in the incident angle on the diffractive optical surface (cemented surface) relative to the height h from the optical axis in the fourth embodiment (fourth numerical example described later). Its abscissa indicates the height from the optical axis, and its ordinate indicates the incident angle. A region within hatched portions is a distribution range of incident angles. If the incident angle of light rays incident on the diffractive optical surface largely varies due to zooming and the like, the diffraction efficiency is lowered, leading to occurrence of the color flare.

In the fourth to sixth embodiments, the curvature of the cemented surface between the negative lenses G21 and G22 are appropriately set to satisfy condition (5), such that a change in the incident angle on the diffractive optical surface is within a range of ±10 degrees. Considering a decrease in the diffraction efficiency, a change in the incident angle on the diffractive optical surface needs to be within a range of ±15 degrees, desirably within ten (10) degrees.

In each embodiment, in order such that the effect of the diffractive optical surface can be sufficiently achieved, the diffraction grating constituting the diffractive optical portion is set to satisfy the following condition (6):

$$-0.05 < (C_2 \cdot H^2 + C_4 \cdot H^4)/f2 < -0.0007 \tag{6},$$

where the phase given to a wave front by the diffractive optical portion is represented by $\phi(h)=(2\pi/\lambda d) \cdot (C_2 \cdot h^2 + C_4 \cdot h^4 + \ldots + C_{2i} \cdot h^{2i})$, $\lambda d$ is the standard wavelength (d-line), h is the distance from the optical axis, $C_2, C_4, \ldots, C_{2i}$ are phase coefficients, H is a half of the effective diameter of the diffractive optical portion, and F2 is the focal length of the second lens unit L2.

If the formula in condition (6) goes beyond the lower limit, correction of the chromatic aberration in the diffractive optical portion cannot be sufficiently achieved. Hence, chromatic aberration of magnification for the g-line at the telephoto end undesirably becomes large in a negative direction. Conversely, if the formula goes beyond the upper limit, chromatic aberration of magnification undesirably becomes worse in a positive direction.

More preferably, the numerical range of condition (6) is set as follows:

$$-0.04 < (C_2 \cdot H^2 + C_4 \cdot H^4)/f2 < -0.001 \tag{6a}.$$

Further, in each embodiment, in order such that the entire lens length of the zoom portion can be shortened, it is preferable to satisfy the following condition (7):

$$0.2 < |f2/(fw \cdot ft)^{1/2}| < 1.5 \tag{7},$$

where f2 is the focal length of the second lens unit L2, and fw and ft are focal lengths of the entire system at the wide-angle end and the telephoto end, respectively.

Here, wide-angle end and telephoto end mean zoom positions at which the lens unit for varying the power is positioned at opposite ends of a mechanically-movable range on the optical axis, respectively.

Condition (7) is relevant to the refractive power of the second lens unit L2, and established for effectively obtaining a desired ratio of power variation while variation of aberrations accompanying the zooming is reduced. If the refractive power of the second lens unit L2 goes beyond the lower limit, and becomes too strong, spherical aberration and coma appearing at the telephoto end become difficult to correct though the structure can be advantageously made small in size. Conversely, beyond the upper limit, the amount of movement of the second lens unit L2 during the zooming operation becomes too large, and the entire length of the lens is undesirably likely to increase.

More preferably, the numerical range of condition (7) is set as follows:

$$0.25 < |f2/(fw \cdot ft)^{1/2}| < 1.3 \qquad (7a).$$

Description will be made hereinafter to fourth to sixth numerical examples corresponding to numerical data of zoom lenses of the fourth to sixth embodiments.

Five surfaces closest to the image plane in the fourth and fifth numerical examples, and two surfaces closest to the image plane in the sixth numerical example are surfaces constituting the glass block G corresponding to color separating prism, face plate, various filters, or the like, respectively.

Table 2 lists the relationship between each of the above-discussed conditions and values in each of the fourth to sixth numerical examples.

Fourth Numerical Example
f = 7.42 to 34.91 Fno = 2.88 to 4.58 2ω = 62.5° to 14.7°

| | | | |
|---|---|---|---|
| R1 = 29.330 | D1 = 3.40 | N1 = 1.516330 | ν1 = 64.1 |
| R2 = 873.438 | D2 = variable | N2 = 1.834807 | ν2 = 42.7 |
| R3 = −239.405 | D3 = 0.90 | N3 = 1.834807 | ν3 = 42.7 |
| R4 = 30.000 (diffraction surface) | D4 = 1.10 | N4 = 1.846660 | ν4 = 23.9 |
| R5 = 7.802 (aspherical surface) | D5 = 3.40 | N5 = 1.743300 | ν5 = 49.3 |
| R6 = 14.479 | D6 = 2.80 | N6 = 1.696797 | ν6 = 55.5 |
| R7 = 35.063 | D7 = variable | N7 = 1.846660 | ν7 = 23.9 |
| R8 = stop | D8 = 0.80 | N8 = 1.730770 | ν8 = 40.5 |
| R9 = 9.109 (aspherical surface) | D9 = 2.80 | N9 = 1.693501 | ν9 = 53.2 |
| R10 = −187.156 | D10 = 0.30 | N10 = 1.516800 | ν10 = 64.2 |
| R11 = 11.105 | D11 = 2.40 | N11 = 1.552320 | ν11 = 63.4 |
| R12 = 75.822 | D12 = 0.70 | N12 = 1.556710 | ν12 = 58.6 |
| R13 = 5.680 | D13 = variable | | |
| R14 = 26.604 (aspherical surface) | D14 = 2.80 | | |
| R15 = −8.101 | D15 = 0.80 | | |
| R16 = −64.790 | D16 = 3.00 | | |
| R17 = ∞ | D17 = 1.20 | | |
| R18 = ∞ | D18 = 1.56 | | |
| R19 = ∞ | D19 = 0.74 | | |
| R20 = ∞ | D20 = 0.50 | | |
| R21 = ∞ | | | |

| focal length variable distance | 7.42 | 23.62 | 34.91 |
|---|---|---|---|
| D2 | 1.10 | 15.49 | 20.30 |
| D7 | 31.69 | 7.42 | 3.43 |
| D13 | 3.19 | 9.15 | 16.02 | aspherical coefficient

| | | | |
|---|---|---|---|
| R5 k = 1.90968e+00 | B = 3.26932e−4 | C = −1.51603e−6 | D = 1.40436e−8 |
| E = −8.41287e−11 | | | |
| R9 k = | B = | C = −3.33866e−7 | D = −6.03963e−9 |

-continued

Fourth Numerical Example
f = 7.42 to 34.91 Fno = 2.88 to 4.58 2ω = 62.5° to 14.7°

| | | | |
|---|---|---|---|
| 1.44754e+00 | | 1.08891e−4 | |
| R14 k = 1.96997e+01 | B = 1.10185e−4 | C = −2.35325e−6 | D = 3.18840e−8 |
| phase coefficient | | | |
| 4th surface | C2 = −2.709e−5 | C4 = 2.602e−6 | |

Fifth Numerical Example
f = 7.42 to 28.10 Fno = 2.88 to 4.14 2ω = 62.5° to 18.2°

| | | | |
|---|---|---|---|
| R1 = 26.413 | D1 = 3.60 | N1 = 1.516330 | ν1 = 64.1 |
| R2 = 201.831 | D2 = variable | N2 = 1.834807 | ν2 = 42.7 |
| R3 = −223.490 | D3 = 0.90 | N3 = 1.834807 | ν3 = 42.7 |
| R4 = 32.000 (diffraction surface) | D4 = 1.10 | N4 = 1.846660 | ν4 = 23.9 |
| R5 = 7.756 (aspherical surface) | D5 = 3.40 | N5 = 1.743300 | ν5 = 49.3 |
| R6 = 14.867 | D6 = 2.70 | N6 = 1.696797 | ν6 = 55.5 |
| R7 = 39.210 | D7 = variable | N7 = 1.846660 | ν7 = 23.9 |
| R8 = stop | D8 = 0.80 | N8 = 1.730770 | ν8 = 40.5 |
| R9 = 9.303 (aspherical surface) | D9 = 2.80 | N9 = 1.693501 | ν9 = 53.2 |
| R10 = −115.903 | D10 = 0.30 | N10 = 1.516800 | ν10 = 64.2 |
| R11 = 10.208 | D11 = 2.40 | N11 = 1.552320 | ν11 = 63.4 |
| R12 = 44.886 | D12 = 0.70 | N12 = 1.556710 | ν12 = 58.6 |
| R13 = 5.465 | D13 = variable | | |
| R14 = 20.056 (aspherical surface) | D14 = 2.80 | | |
| R15 = 13.034 | D15 = 0.80 | | |
| R16 = 80.333 | D16 = 3.00 | | |
| R17 = ∞ | D17 = 1.20 | | |
| R18 = ∞ | D18 = 1.56 | | |
| R19 = ∞ | D19 = 0.74 | | |
| R20 = ∞ | D20 = 0.50 | | |
| R21 = ∞ | | | |

| focal length variable distance | 7.42 | 23.15 | 28.10 |
|---|---|---|---|
| D2 | 1.10 | 15.89 | 17.08 |
| D7 | 29.72 | 6.68 | 2.81 |
| D13 | 4.96 | 11.40 | 12.99 | aspherical coefficient

| | | | |
|---|---|---|---|
| R5 k = −2.64927 | B = 5.116166e−4 | C = −5.32355e−6 | D = 5.40717e−8 |
| E = −2.74472e−10 | | | |
| R9 k = −1.73832 | B = 1.38186e−4 | C = −2.36879e−7 | D = −1.46375e−8 |
| R14 k = −1.69689e1 | B = 2.25785e−4 | C = −2.87908e−6 | D = 2.06276e−8 |
| phase coefficient | | | |
| 4th surface | C2 = −4.831e−4 | C4 = 7.876e−6 | |

Sixth Numerical Example
f = 4.19 to 41.88 Fno = 2.05 to 2.47 2ω = 56.5° to 6.2°

| | | | |
|---|---|---|---|
| R1 = 16.061 (aspherical surface) | D1 = 0.70 | N1 = 1.846660 | ν1 = 23.8 |

-continued

Sixth Numerical Example
f = 4.19 to 41.88 Fno = 2.05 to 2.47 2ω = 56.5° to 6.2°

| | | | |
|---|---|---|---|
| R2 = 12.461 (diffraction surface) | D2 = 4.80 | N2 = 1.696797 | ν2 = 55.5 |
| R3 = −119.806 | D3 = variable | N3 = 1.834807 | ν3 = 42.7 |
| R4 = 25.132 | D4 = 0.60 | N4 = 1.834807 | ν4 = 42.7 |
| R5 = 7.000 (diffraction surface) | D5 = 0.50 | N5 = 1.603112 | ν5 = 60.7 |
| R6 = 5.276 (aspherical surface) | D6 = 2.20 | N6 = 1.583126 | ν6 = 59.4 |
| R7 = −5.703 | D7 = 0.70 | N7 = 1.846659 | ν7 = 23.8 |
| R8 = −25.804 | D8 = variable | N8 = 1.487490 | ν8 = 70.2 |
| R9 = Stop | D9 = 1.00 | N9 = 1.846659 | ν9 = 23.8 |
| R10 = 4.977 (aspherical surface) | D10 = 2.70 | N10 = 1.516330 | ν10 = 64.2 |
| R11 = 214.075 | D11 = 0.08 | | |
| R12 = 7.353 | D12 = 0.55 | | |
| R13 = 4.533 | D13 = variable | | |
| R14 = 8.185 (aspherical surface) | D14 = 2.40 | | |
| R15 = −6.648 | D15 = 0.50 | | |
| R16 = −8.716 | D16 = 0.75 | | |
| R17 = ∞ | D17 = 3.27 | | |
| R18 = ∞ | | | |

| | | | |
|---|---|---|---|
| focal length | 4.19 | 21.50 | 41.88 |
| variable distance | | | |
| D3 | 0.50 | 9.06 | 11.47 |
| D8 | 11.78 | 3.22 | 0.80 |
| D13 | 4.60 | 2.36 | 6.41 | aspherical coefficient

| | | | |
|---|---|---|---|
| R1 k = −8.94672e−1 | B = 1.28399e−5 | C = 1.01309e−8 | |
| R6 k = −4.92784e−1 E = −2.40857e−7 | B = −1.06847e−4 | C = 1.19484e−5 | D = 2.88595e−7 |
| R10 k = −1.29418 E = 2.97884e−8 | B = 5.50069e−4 | C = −3.90914e−6 | D = −1.86302e−7 |
| R14 k = −2.44799 E = −1.50444e−7 | B = −3.98205e−4 | C = 4.08972e−5 | D = −2.03112e−6 | phase coefficient

| | | |
|---|---|---|
| 2nd surface | C2 = −1.062e−3 | C4 = 1.160e−6 |
| 4th surface | C2 = 7.833e−3 | C4 = 2.279e−4 |

TABLE 2

| Numerical Example | 4 | 5 | 6 |
|---|---|---|---|
| RD/f2 | −1.936 | −2.016 | −1.689 |
| $(C_2 \cdot H^2 + C_4 \cdot H^4)/f2$ | −0.001266 | −0.001267 | −0.03065 |
| $|f2/(fw \cdot ft)^{1/2}|$ | 0.963 | 1.100 | 0.313 |

(Seventh Embodiment)

A seventh embodiment of the present invention is now discussed with reference to FIG. 25. This embodiment is directed to a video camera (an optical apparatus) using a zoom lens in any of the first to sixth embodiments as a photo-taking optical system.

Referring to FIG. 25, there are shown a video camera body 10, a photo-taking optical system 11 composed of a zoom lens in any of the first to sixth embodiments, a solid-state image pickup element (an opto-electric converting element) 12, such as CCD or CMOS, which receives the image of an object formed by the photo-taking optical system 11, a memory 13 for storing data of the object image received by the image pickup element 12, and a finder 14 for observing the object image displayed on a display element (not shown). The display element is composed of a liquid crystal panel, or the like, and displays the object image formed on the pickup element 12.

A compact optical apparatus having high optical performance can be thus achieved by incorporating a zoom lens of the present invention into an optical apparatus such as a video camera.

(Eighth Embodiment)

An eighth embodiment of the present invention is discussed with reference to FIG. 26. This embodiment is directed to a digital still camera (an optical apparatus) using a zoom lens in any of the first to sixth embodiments as a photo-taking optical system.

Referring to FIG. 26, there are shown a camera body 20, a photo-taking optical system 21 composed of a zoom lens in any of the first to sixth embodiments, a stroboscope 22 built in the camera body 20, an external finder 23, and a shutter button 24. In the digital still camera of this embodiment, the photo-taking optical system 21 forms the image of an object on a solid-state image pickup element (an opto-electric converting element) (not shown), and a memory (not shown) stores data of the object image opto-electrically converted by the image pickup element.

A compact optical apparatus having high optical performance can be thus achieved by incorporating a zoom lens of the present invention into an optical apparatus such as a digital still camera.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A zoom lens system comprising:
   a first lens unit having positive optical power, said first lens unit being not moved for zooming; and
   a second lens unit having negative optical power, said second lens unit being disposed on a rearward side of said first lens unit, and being moved for zooming;
   wherein said first lens unit has a cemented surface convex toward a forward side, and a diffractive optical portion is provided on said cemented surface.

2. A zoom lens system according to claim 1, wherein said zoom lens forms an image on an opto-electric converting element.

3. A zoom lens system comprising:
   a first lens unit having positive optical power; and
   a second lens unit having negative optical power, said second lens unit being disposed on a rearward side of said first lens unit, and being moved for zooming;
   wherein said first lens unit has a cemented surface convex toward a forward side, a diffractive optical portion is provided on said cemented surface, and a following condition is satisfied, $$0.5 < RD/f1 < 1.2$$

where RD is the radius of curvature of said cemented surface, and f1 is the focal length of said first lens unit.

4. A zoom lens system according to claim 3, wherein a following condition is satisfied, $$-0.01 < C_2 \cdot (ft/Fnot) < 0$$

where $\lambda d$ is the wavelength of d-line, h is the distance from an optical axis, $C_{2i}$ is the phase coefficient, the phase given to a wave front by said diffractive optical portion is represented by a follows formula, $$\phi(h) = (2\pi/\lambda d) \cdot (C_2 \cdot h^2 + C_4 \cdot h^4 + \ldots + C_{2i} \cdot h^{2i}),$$

ft is the focal length of an entire system at telephoto end, and Fnot is the F-number at telephoto end.

5. A zoom lens system according to claim 3, further comprising a third lens unit disposed on a rearward side of said second lens unit, said third lens unit being not moved for zooming.

6. A zoom lens system according to claim 3, further comprising a third lens unit disposed on a rearward side of said second lens unit, said third lens unit being not moved for zooming; and a fourth lens unit having positive optical power, said fourth lens unit being disposed on a rearward side of said third lens unit, and being moved for zooming.

7. A zoom lens system according to claim 3, further comprising a third lens unit disposed on a rearward side of said second lens unit, said third lens unit being not moved for zooming; and a fourth lens unit having negative optical power, said fourth lens unit being disposed on a rearward side of said third lens unit, and being moved for zooming.

8. A zoom lens system according to claim 3, further comprising a third lens unit disposed on a rearward side of said second lens unit, said third lens unit being not moved for zooming; a fourth lens unit having negative optical power, said fourth lens unit being disposed on a rearward side of said third lens unit, and being moved for zooming; and a fifth lens unit having positive optical power, said fifth lens unit being disposed on a rearward side of said fourth lens unit.

9. A zoom lens system according to claim 3, wherein a following condition is satisfied, $$1.3 < |f1/(fw \cdot ft)^{1/2}| < 4.0$$

where f1 is the focal length of said first lens unit, and fw and ft are focal lengths of an entire system at wide-angle end and telephoto end, respectively.

10. A zoom lens system according to claim 3, further comprising a third lens unit disposed on a rearward side of said second lens unit, said third lens unit being not moved for zooming, and being moved for stabilizing an image; and a lens component disposed on a rearward side of said third lens unit, said lens component including at least one lens unit movable for zooming; and wherein a following condition is satisfied, $$0.5 < |(1-\beta 3) \cdot \beta r| < 3$$

where $\beta 3$ is the magnification of said third lens unit at telephoto end for infinity object, and $\beta r$ is the magnification of said lens component at telephoto end for infinity object.

11. A zoom lens system according to claim 3, wherein said zoom lens forms an image on an opto-electric converting element.

12. A zoom lens system comprising:
a first lens unit having positive optical power; and
a second lens unit having negative optical power, said second lens unit being disposed on a rearward side of said first lens unit, and being moved for zooming;
wherein said second lens unit has a cemented surface convex toward a forward side, and a diffractive optical portion is provided on said cemented surface.

13. A zoom lens system according to claim 12, wherein a following condition is satisfied, $$-2.8 < RD/f2 < -1.2$$

where RD is the radius of curvature of said cemented surface, and f2 is the focal length of said second lens unit.

14. A zoom lens system according to claim 12, wherein a following condition is satisfied, $$-0.05 < (C_2 \cdot H^2 + C_4 \cdot H^4)/f2 < -0.0007$$

where $\lambda d$ is the wavelength of d-line, h is the distance from an optical axis, $C_{2i}$ is the phase coefficient, the phase given to a wave front by said diffractive optical portion is represented by a follows formula, $$\phi(h) = (2\pi/\lambda d) \cdot (C_2 h^2 + C_4 h^4 + \ldots + C_{2i} h^{2i}),$$

H is a half of the effective diameter of said diffractive optical portion, and f2 is the focal length of said second lens unit.

15. A zoom lens system according to claim 12, further comprising a third lens unit disposed on a rearward side of said second lens unit.

16. A zoom lens system according to claim 12, further comprising a third lens unit having positive optical power, said third lens unit being disposed on a rearward side of said second lens unit; and a fourth lens unit having positive optical power, said fourth lens unit being disposed on a rearward side of said third lens unit.

17. A zoom lens system according to claim 16, wherein said first lens unit, said second lens unit, said third lens unit, and said fourth lens unit are moved for zooming.

18. A zoom lens system according to claim 16, wherein said first lens unit, and said third lens unit are not moved for zooming, and said fourth lens unit is moved for zooming.

19. A zoom lens system according to claim 12, wherein a following condition is satisfied, $$0.2 < |f2/(fw \cdot ft)^{1/2}| < 1.5$$

where f2 is the focal length of said second lens unit, and fw and ft are focal lengths of an entire system at wide-angle end and telephoto end, respectively.

20. A zoom lens system according to claim 12, wherein said zoom lens forms an image on an opto-electric converting element.

21. A camera comprising:
a zoom lens system recited in claim 1; and
an opto-electric converting element for receiving an image formed by said zoom lens system.

22. A camera comprising:
a zoom lens system recited in claim 3; and
an opto-electric converting element for receiving an image formed by said zoom lens system.

23. A camera comprising:
a zoom lens system recited in claim 12; and
an opto-electric converting element for receiving an image formed by said zoom lens system.

* * * * *